March 4, 1952   W. WOCKENFUSS   2,588,190
ANALYZER AND TRANSFER UNIT IN
TABULATING AND LIKE MACHINES
Filed June 13, 1946   15 Sheets-Sheet 1

INVENTOR.
William Wockenfuss
BY
ATTORNEY

March 4, 1952

W. WOCKENFUSS
ANALYZER AND TRANSFER UNIT IN
TABULATING AND LIKE MACHINES 2,588,190

Filed June 13, 1946

INVENTOR.
William Wockenfuss
BY
*Edward L. Mueller*
ATTORNEY

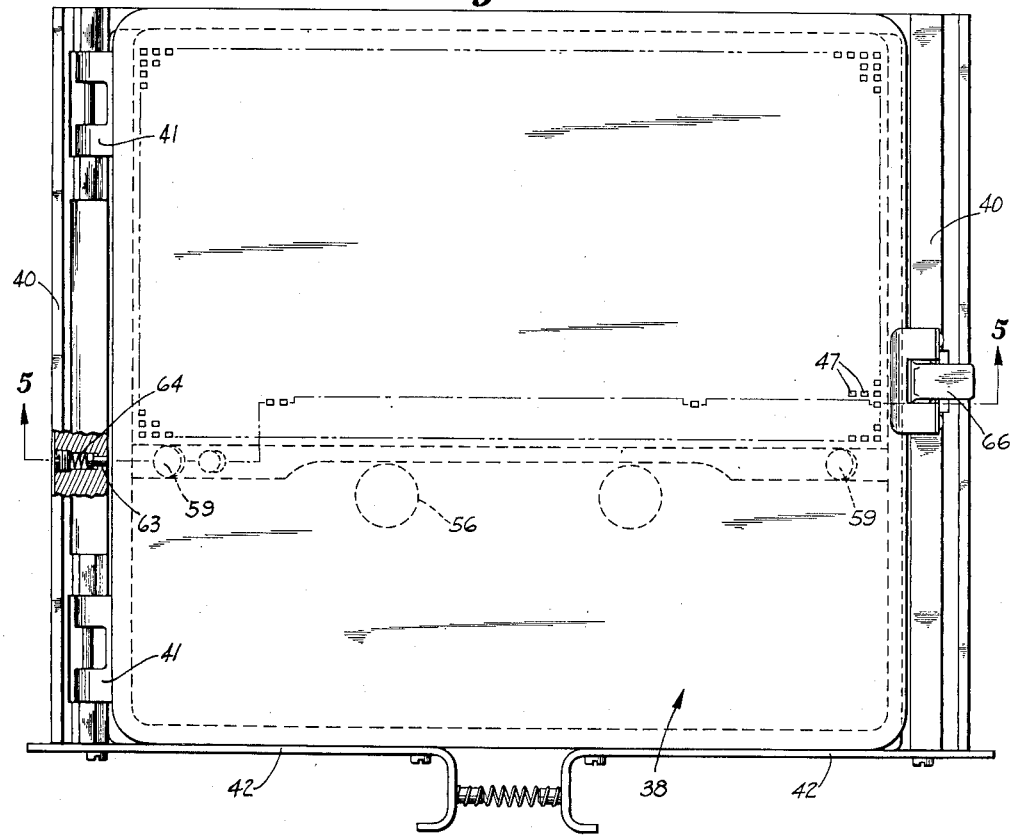
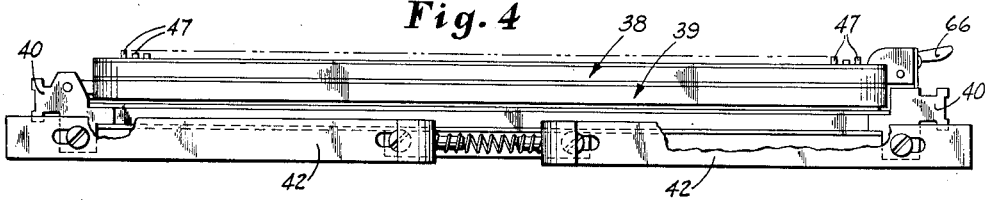

March 4, 1952

W. WOCKENFUSS
ANALYZER AND TRANSFER UNIT IN
TABULATING AND LIKE MACHINES 2,588,190

Filed June 13, 1946

INVENTOR.
William Wockenfuss
BY
Edward L. Mueller
ATTORNEY

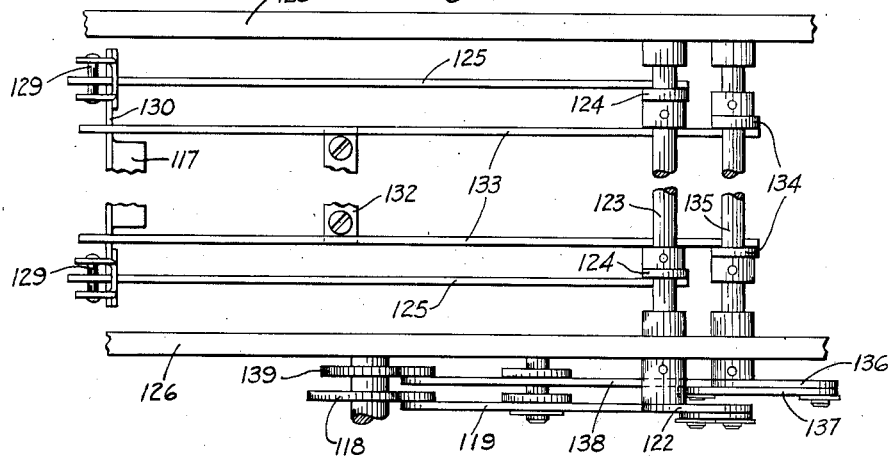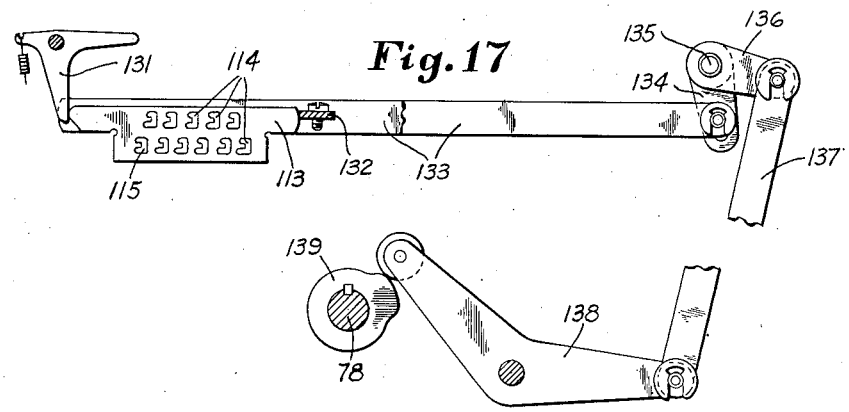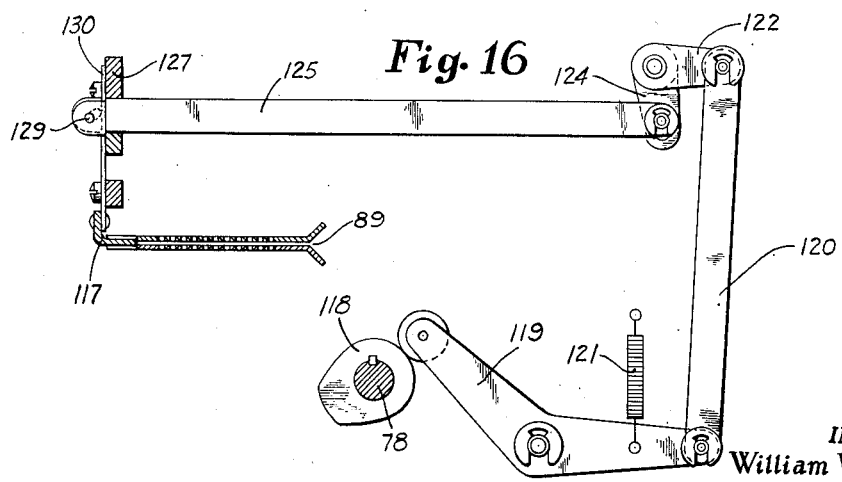

INVENTOR.
William Wockenfuss
BY
Edward L. Mueller
ATTORNEY

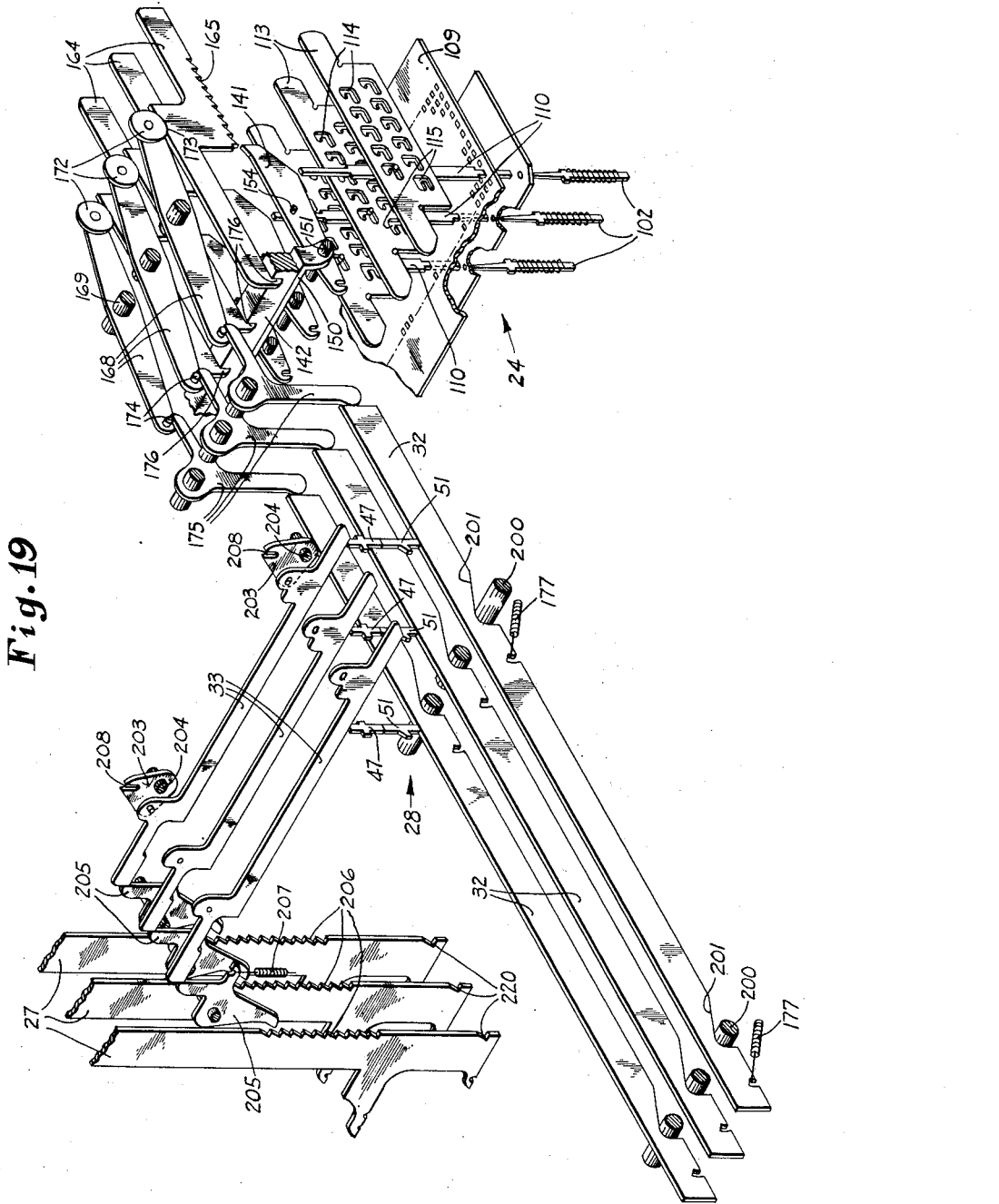

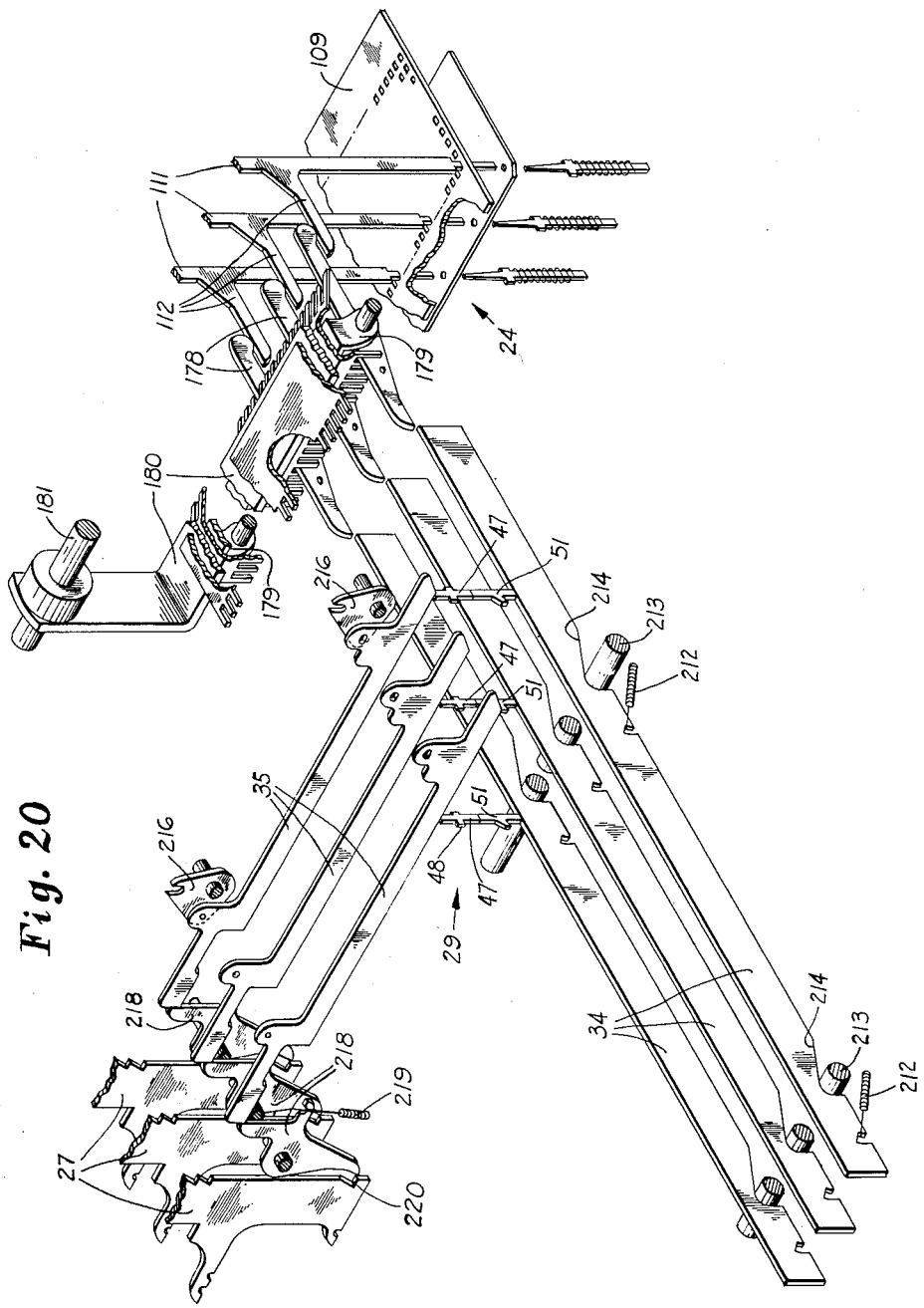

INVENTOR.
William Wockenfuss

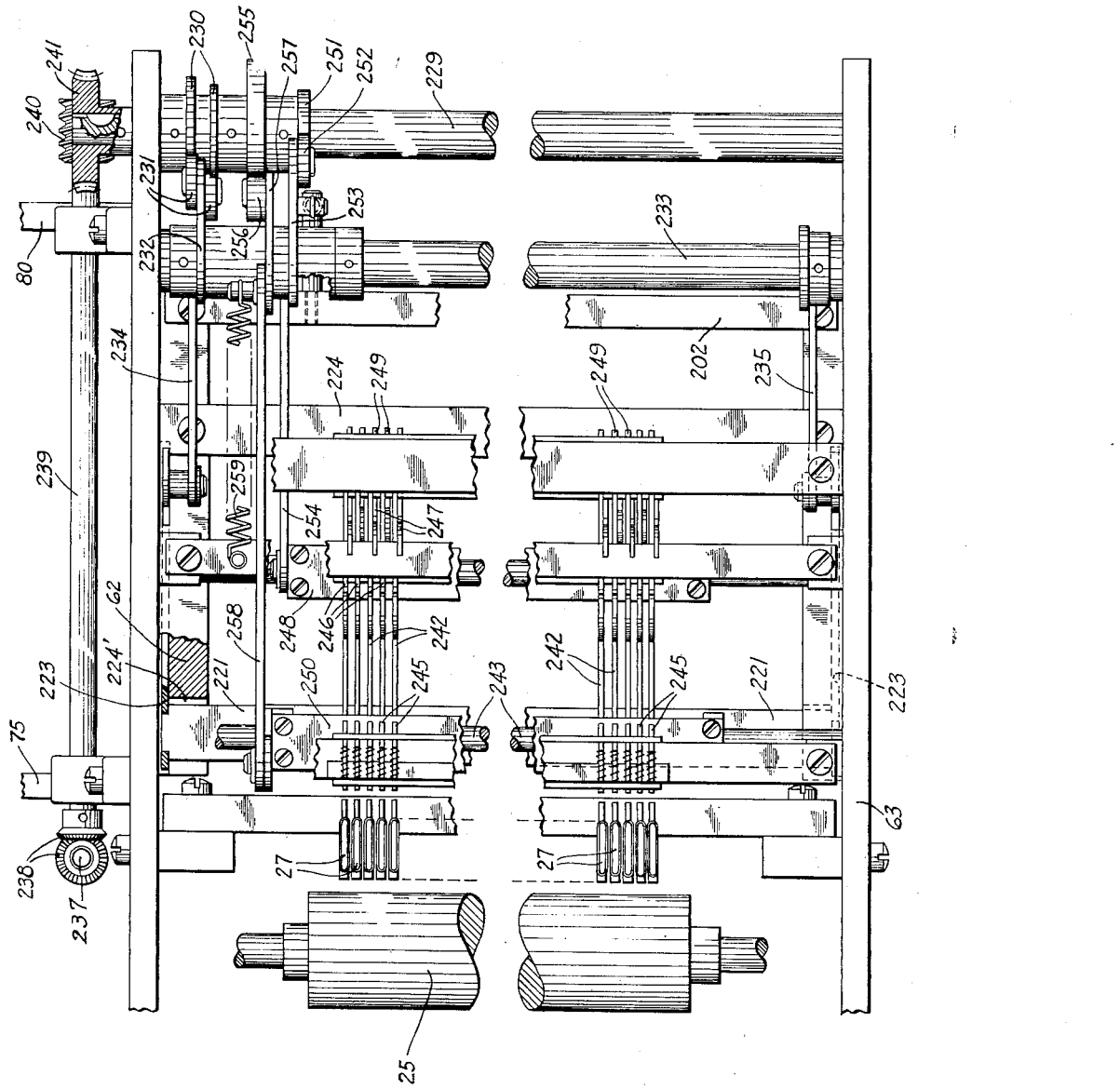

Patented Mar. 4, 1952

2,588,190

UNITED STATES PATENT OFFICE 2,588,190

ANALYZER AND TRANSFER UNIT IN TABULATING AND LIKE MACHINES

William Wockenfuss, Union, N. J., assignor, by mesne assignments, to Burroughs Adding Machine Company, a corporation of Michigan Application June 13, 1946, Serial No. 676,520

20 Claims. (Cl. 101—93)

This invention relates to improvements in statistical card controlled machines and has particular reference to a tabulator.

Generally, tabulating machines of the type with which the present invention is concerned have analyzers which operate upon cards bearing index points arranged in columns and denoting identifying data. These index points are punched in various locations in the columns to represent data which is read by the analyzer and then transmitted to various recording members such printing devices, accumulators, and other like instrumentalities, that are operated to print said data on a report sheet. Heretofore, the transmission of this data has been accomplished by the use of plug boards and translator or wiring units each representing a different report analysis to be obtained from the punched cards and each separately introduced into the tabulating machine whenever alteration in the nature of a report is to be obtained. The separate plug boards and translator units are of complicated construction and several of them are usually supplied for every machine installation, thus materially increasing the cost of the equipment to the user. Furthermore, the nature of said plug boards and units is such that their set-up for any particular report analysis cannot be changed except by highly trained technicians and only then after a considerable expenditure of time, and in some instances the units must be returned to the factory for alterations.

It is proposed, by the present invention, to eliminate the use of costly plug boards or translation units and to substitute therefor a greatly simplified and inexpensive transfer unit adapted for insertion between the recording mechanisms and a card analyzer-controlled mechanism of the tabulator, and containing a set-up device in the form of a single sheet or body of material prefabricated in accordance with any proposed report analysis to control transfer elements of said unit and being readily and quickly replaceable by a similar device whenever the nature of a report to be tabulated is to be changed.

Another feature of the invention is to utilize said set-up device to differentially control sections of transfer elements forming part of said transfer unit so that certain of said elements will be activated to control the transmission of data while others of said elements will be rendered inoperative to perform any function.

The inventive idea involved is capable of receiving a variety of mechanical expressions some of which, for purposes of illustration, are shown in the accompanying drawings; but it is to be expressly understood that said drawings are employed merely to facilitate the description of the invention as a whole and not to define the limits thereof, reference being had to the appended claims for this purpose.

In the drawings:

Fig. 3 is a top plan view of one of the transfer units, partly broken away and shown in section.

Fig. 4 is a front elevation thereof.

Fig. 5 is a transverse section on the line 5—5 of Fig. 3.

Figure 10:
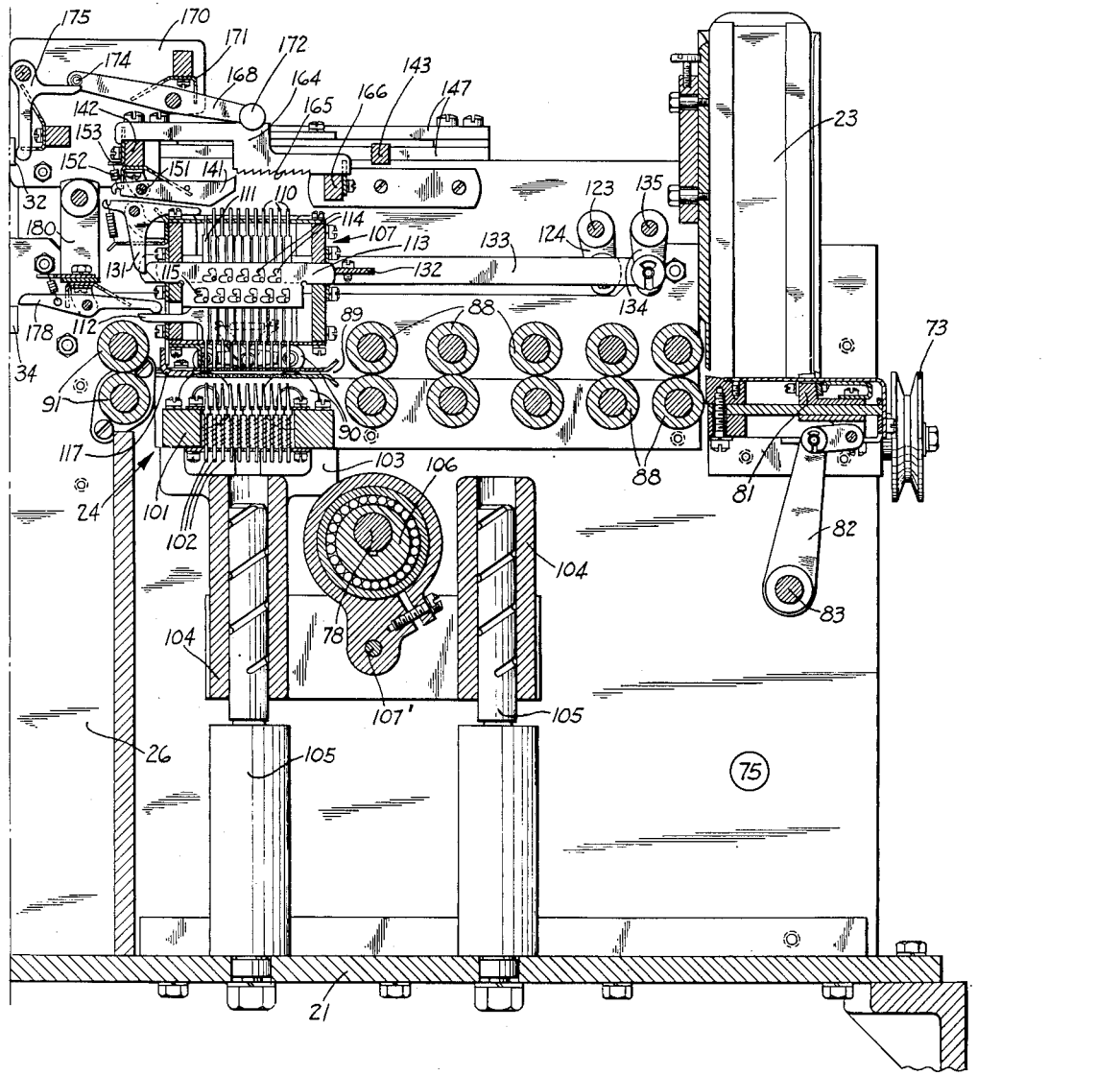
Figure 11:
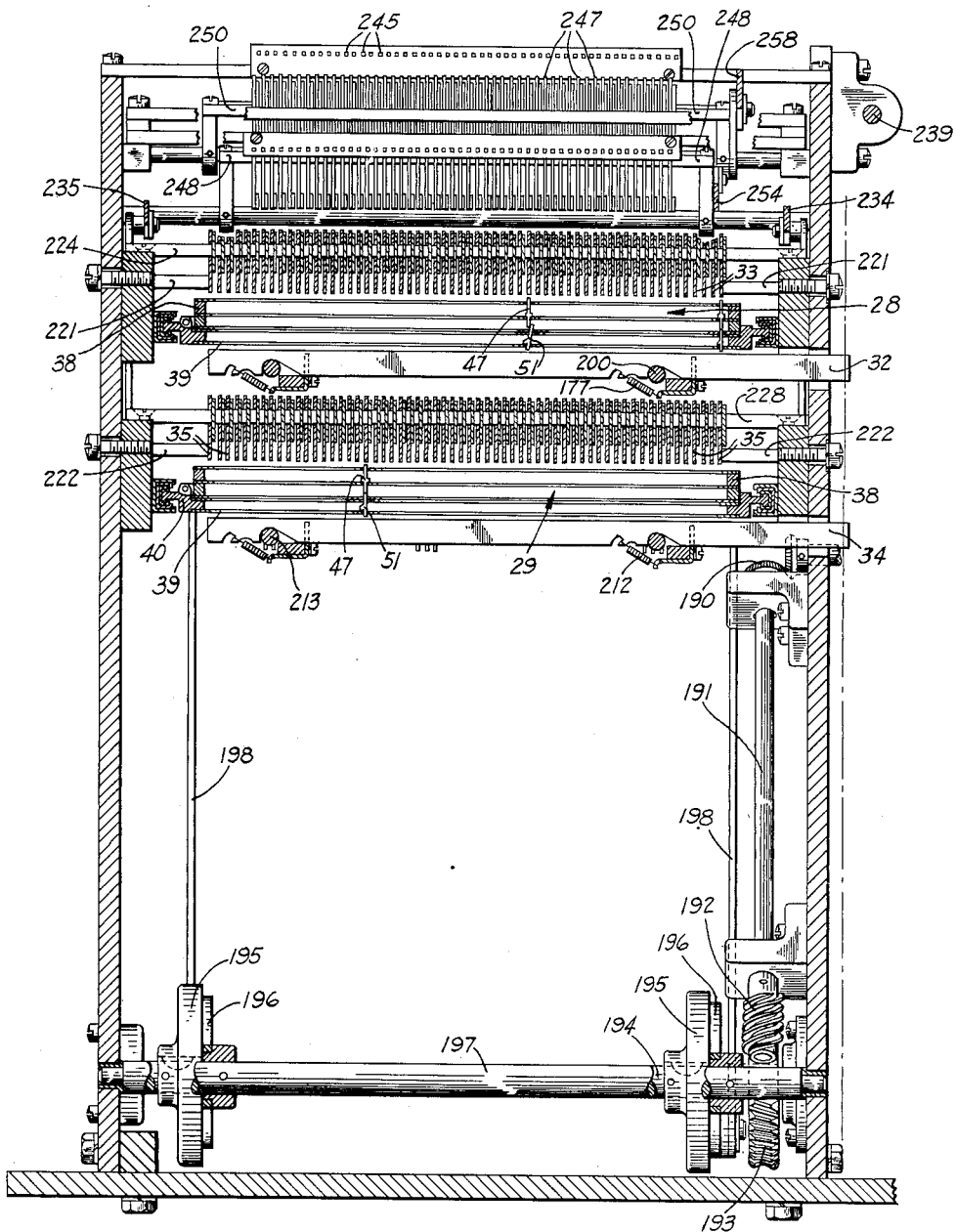

Figs. 10 and 11, when arranged side by side with Fig. 11 at left, combine to illustrate a vertical longitudinal section through the machine.

Figure 12:
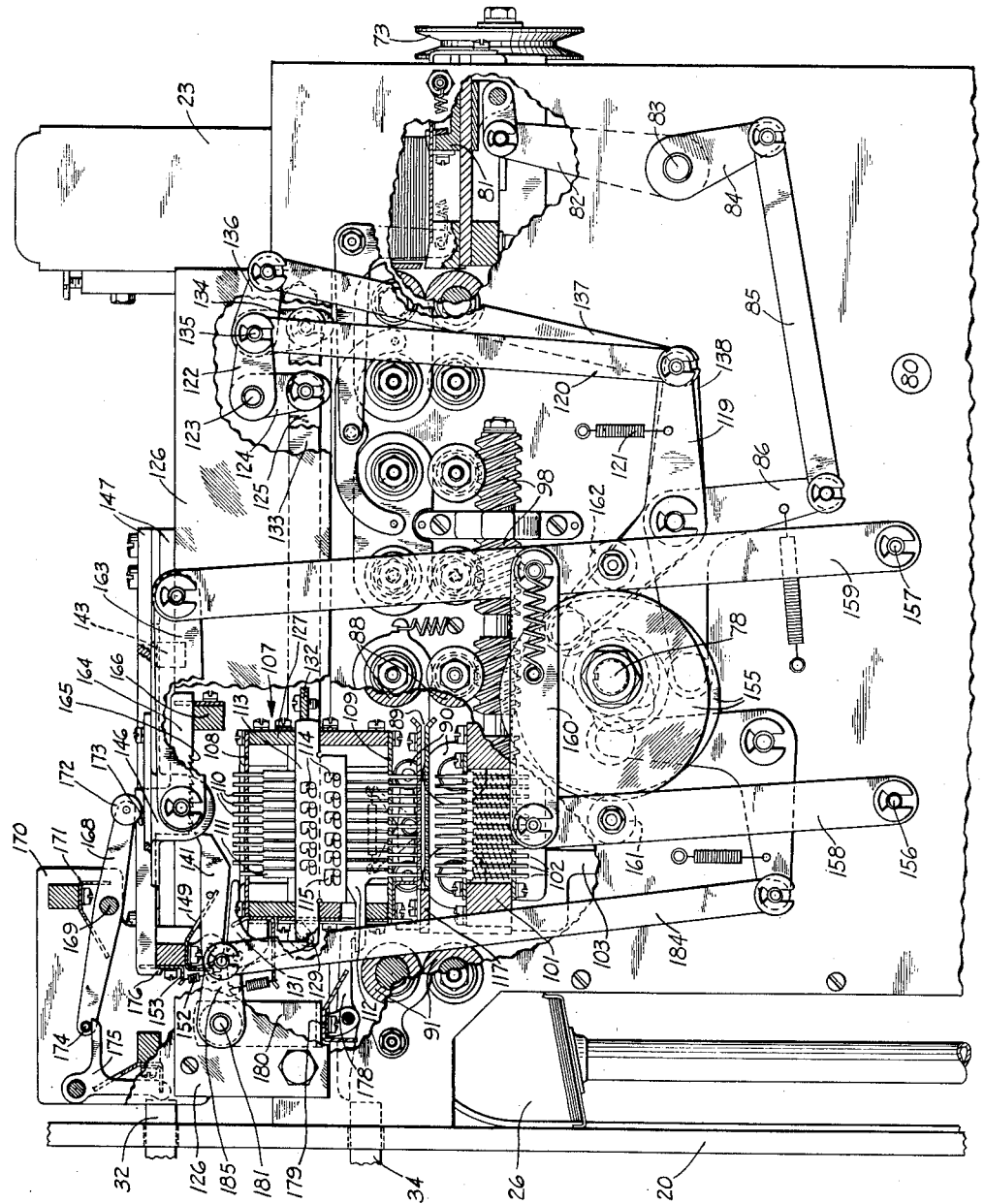

Fig. 12 is an enlarged front elevation, partly broken away and shown in section, of the analyzing section of the machine together with associated mechanisms controlled thereby.

Figure 13:
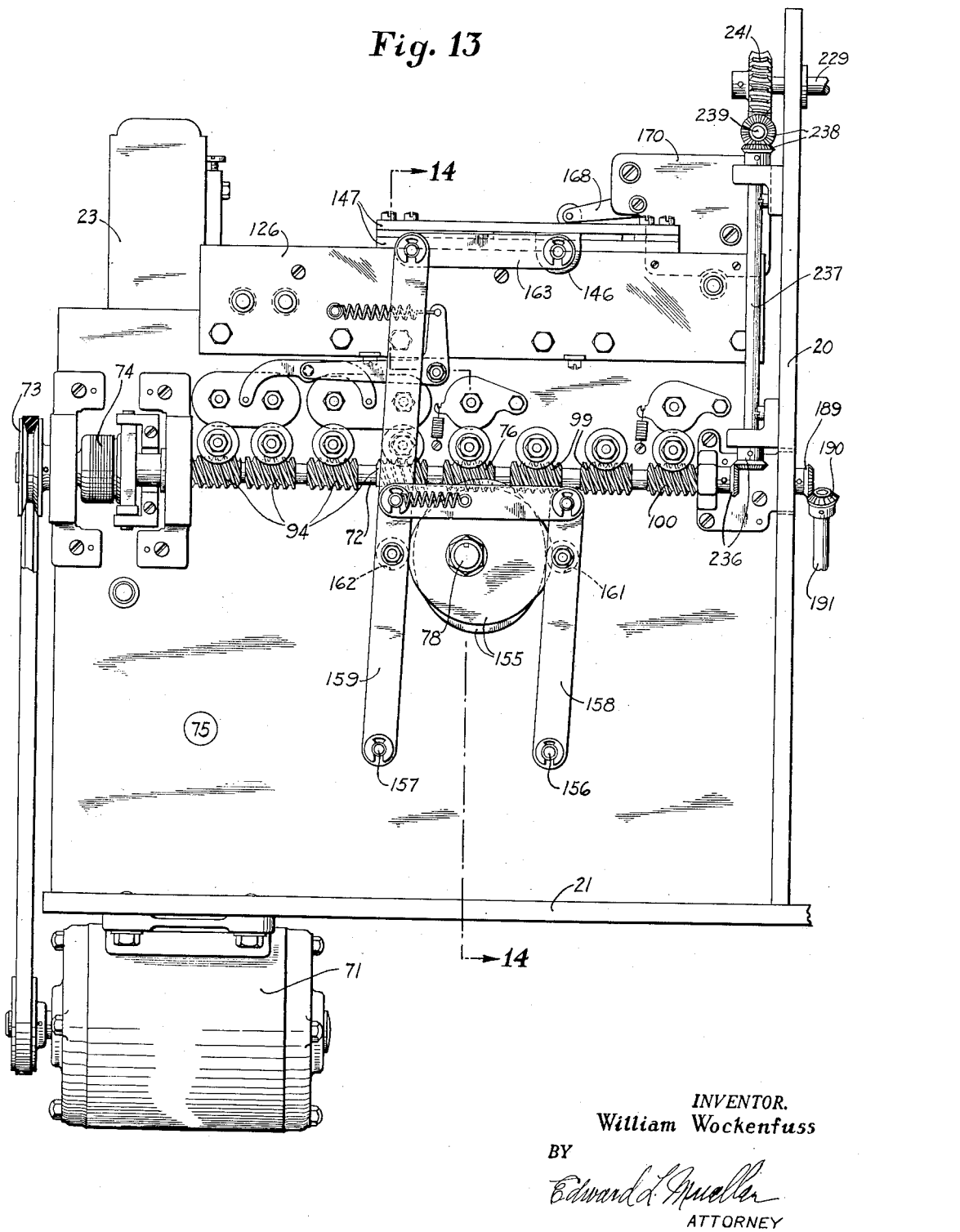
Figure 14:
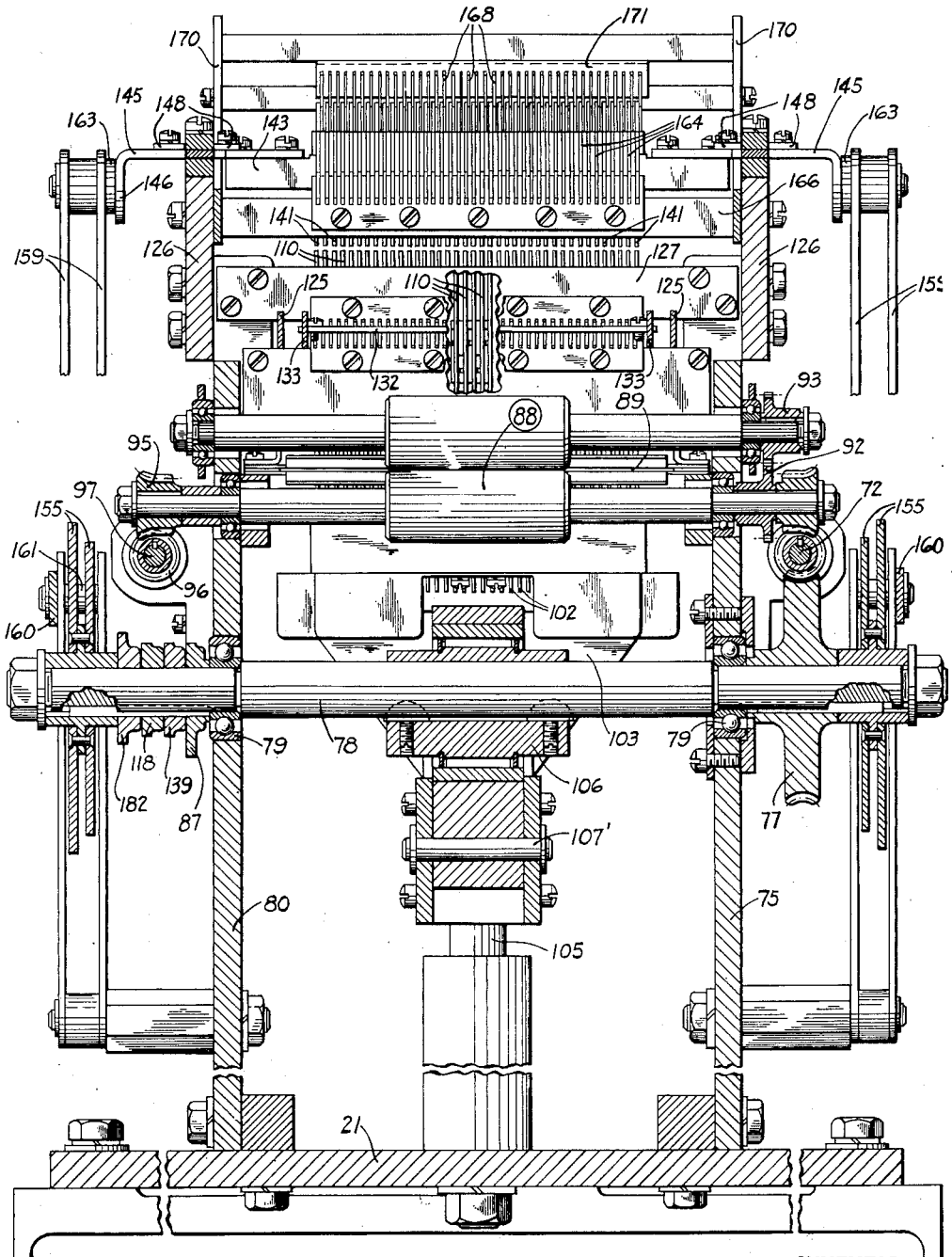

Fig. 13 is a rear elevation of the portion of the machine shown in Fig. 12, and further illustrat- Fig. 14 is an enlarged transverse sectional view taken substantially on the line 14—14 of Fig. 13.

Fig. 15 is a fragmentary top plan view showing the operating mechanisms for the analyzer card stop and the lock plates forming part of the upper pin box illustrated in Figs. 10 and 12.

Fig. 16 is a detail view showing a side elevation, partly in section, of the mechanism controlling the card stop.

Fig. 17 is a similar view of the lock plate control.

Figure 18:
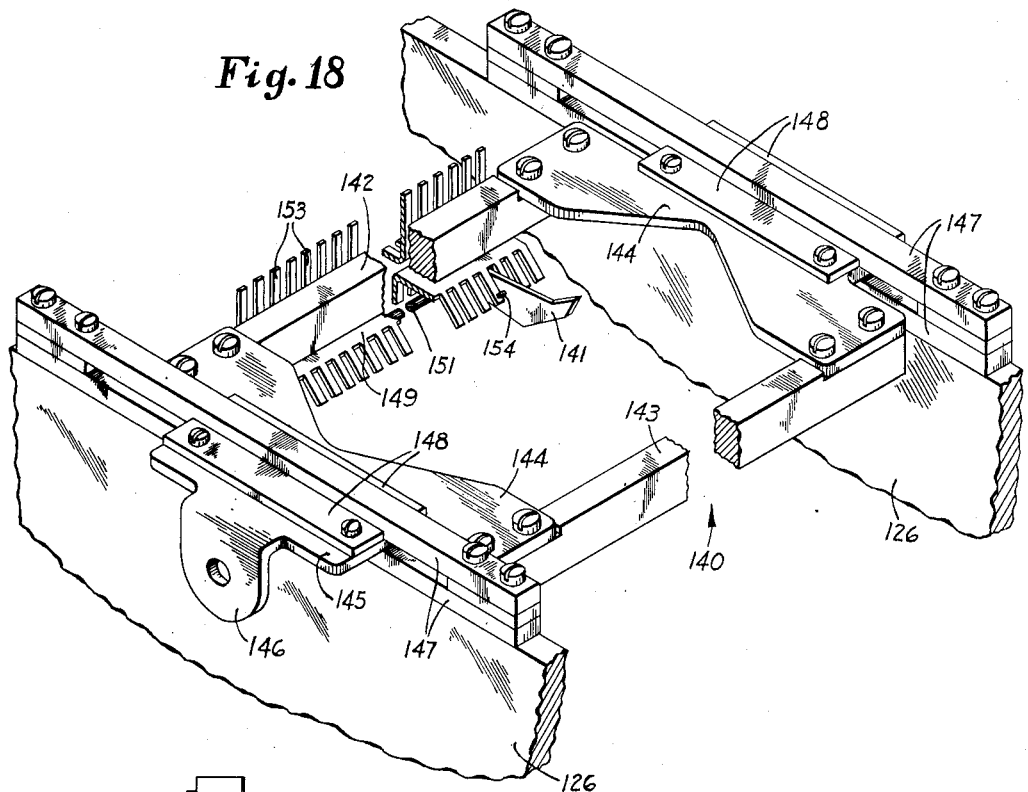

Fig. 18 is an enlarged fragmentary perspective view of the scanning device which cooperates with the card analyzer.

Fig. 19 is an enlarged fragmentary isometric view of the upper transfer unit and associated mechanisms.

Fig. 20 is a similar view of the lower transfer unit.

Figure 21:
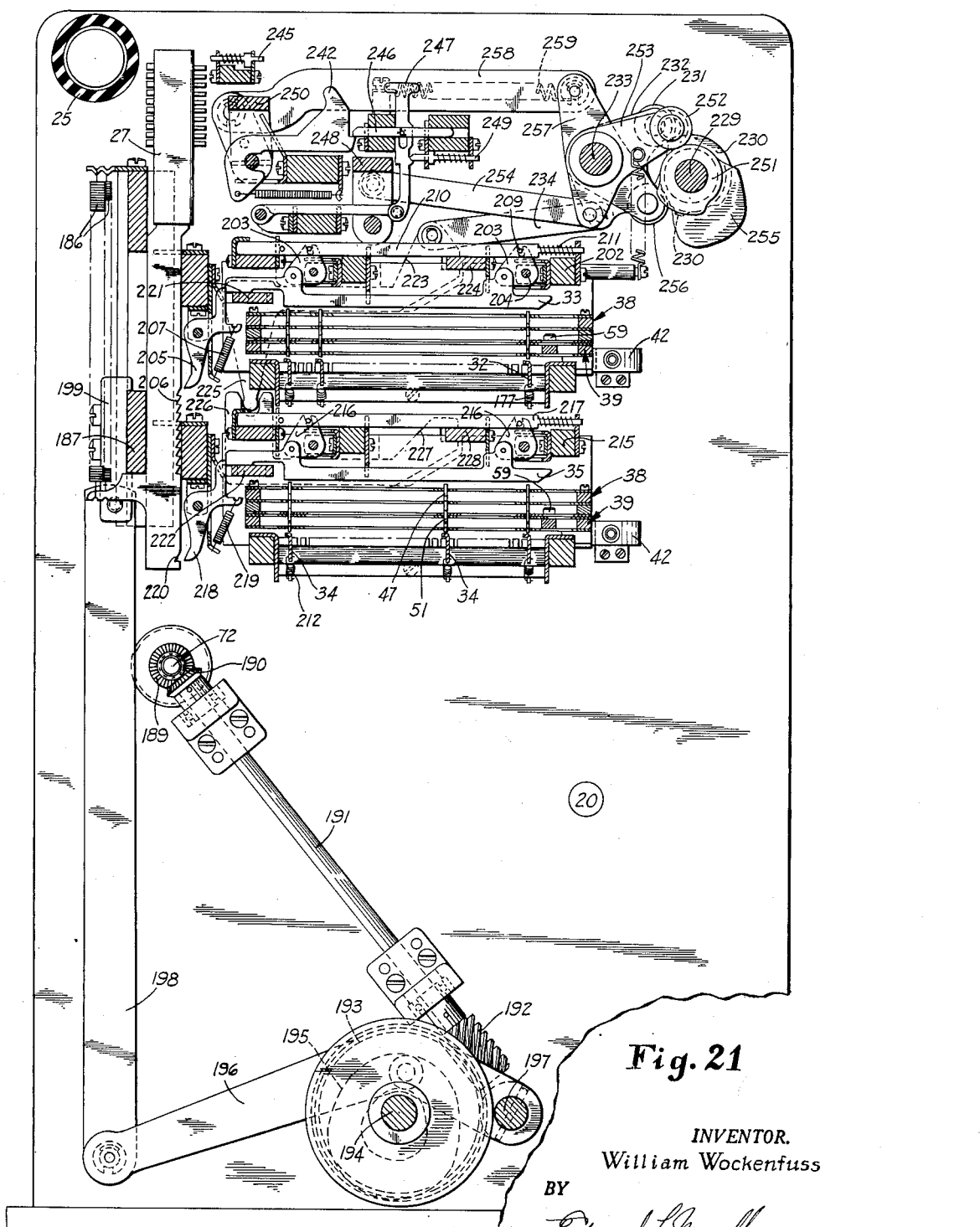

Fig. 21 is a vertical transverse section through the tabulating portion of the machine.

Fig. 22 is an enlarged fragmentary top plan view thereof, and

Figure 23:
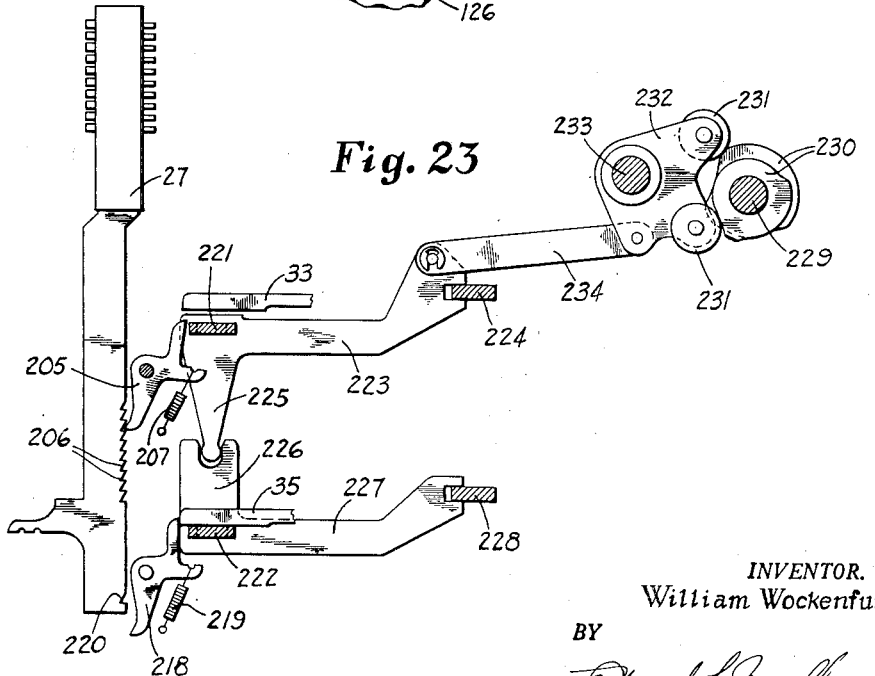

Fig. 23 is a detail view showing a fragmentary elevation, partly in section, of the releasing means for the type bar control pawl.

For brevity and clarity of disclosure, the present invention is illustrated in connection with a machine which will control a group of recording members, such as type bars, to print data transmitted thereto in accordance with the analysis of the cards which are fed through the analyzer, but it will be understood that said invention is adaptable to a machine embodying other recording instrumentalities and totalizing means, and other features such as automatic group control effected upon the changes of designation in the cards.

The machine, generally, comprises a card feeding and analyzing section shown in Fig. 10, and a tabulating section illustrated in Fig. 11, the two sections being separated by the partition wall 20 forming a part of the main supporting frame 21 which is enclosed within the outer casing 22 of the machine. Cards are fed from a magazine 23 to a mechanical analyzer 24 which is, generally, of a type well known in the art and at which the cards are stopped while the columns thereof are simultaneously sensed for perforations designating data to be transmitted to the tabulating section for recording upon a report sheet 54 mounted on the platen 25 of a printing mechanism of any conventional and well known type. After being analyzed, the cards are fed from the mechanism 24 into a discharge chamber 26 opening into a side of the casing 22.

With respect to the tabulating section of the machine, there are disclosed herein only mechanisms for controlling certain operations of a plurality of type bars 27 utilized to list upon said report sheet 54 the data transmitted from the analyzer 24, and there have been omitted from the illustration such features as automatic group control, total-taking and other recording devices well known in the art and which are unnecessary to a complete disclosure of the invention herein claimed, but which are capable of being built into the present machine. In connection with the type bars 27, it is noted that the same are arranged in a line which extends parallel to the direction of feed of the cards toward and through the analyzer 24. This arrangement, generally, permits of the use of one or more transfer units, such as illustrated in Figs. 2 to 9, which form part of the present invention and are employed for the transfer of data read from the cards to the recording members or type bars 27 to differentially control the latter in a greatly simplified and direct manner.

*Transfer units*

Two such units, generally indicated at 28 and 29, are shown herein, the upper unit 28 being utilized to effect the selection and control of groups of the type bars while the lower unit 29 is employed for differently controlling said bars.

The units 28 and 29 are mounted in the machine between certain elements of an analyzer controlled mechanism and similar elements of mechanisms for differentially controlling the type bars, which mechanisms will be later described in detail, and the positions of said units are such that they will act as transfer media for conveying data from the card analyzer to the type bars. Since said units are identical in construction, only their functions being different, a description of one will suffice for an understanding of their purposes.

Figure 1:
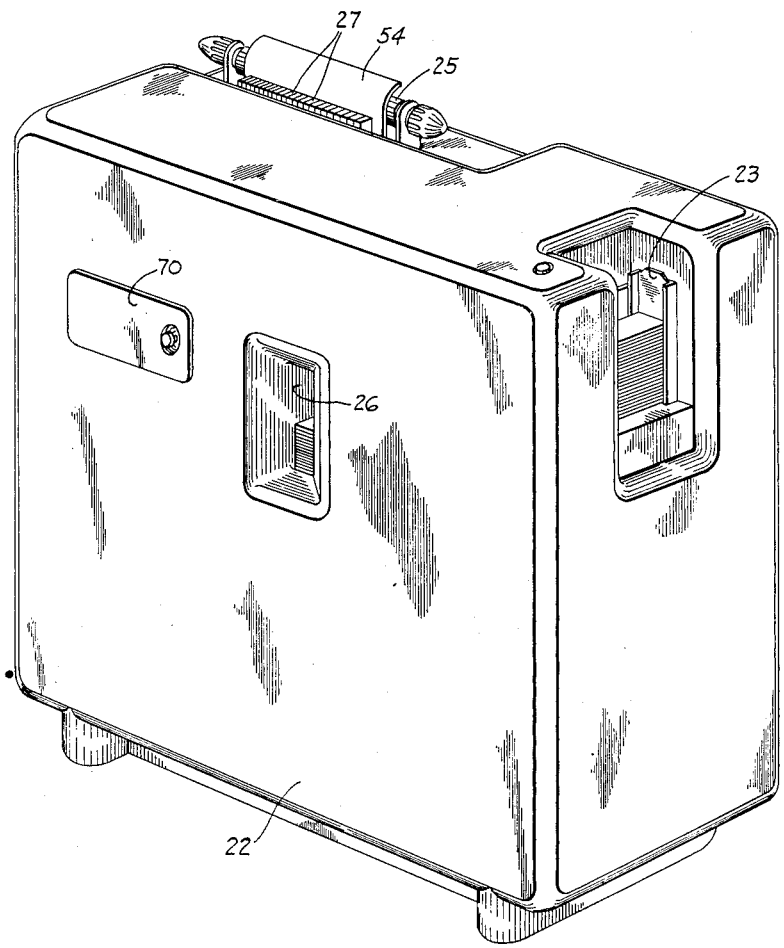
Fig. 1 is a perspective view of a tabulating machine constructed in accordance with the invention.
Figure 2:
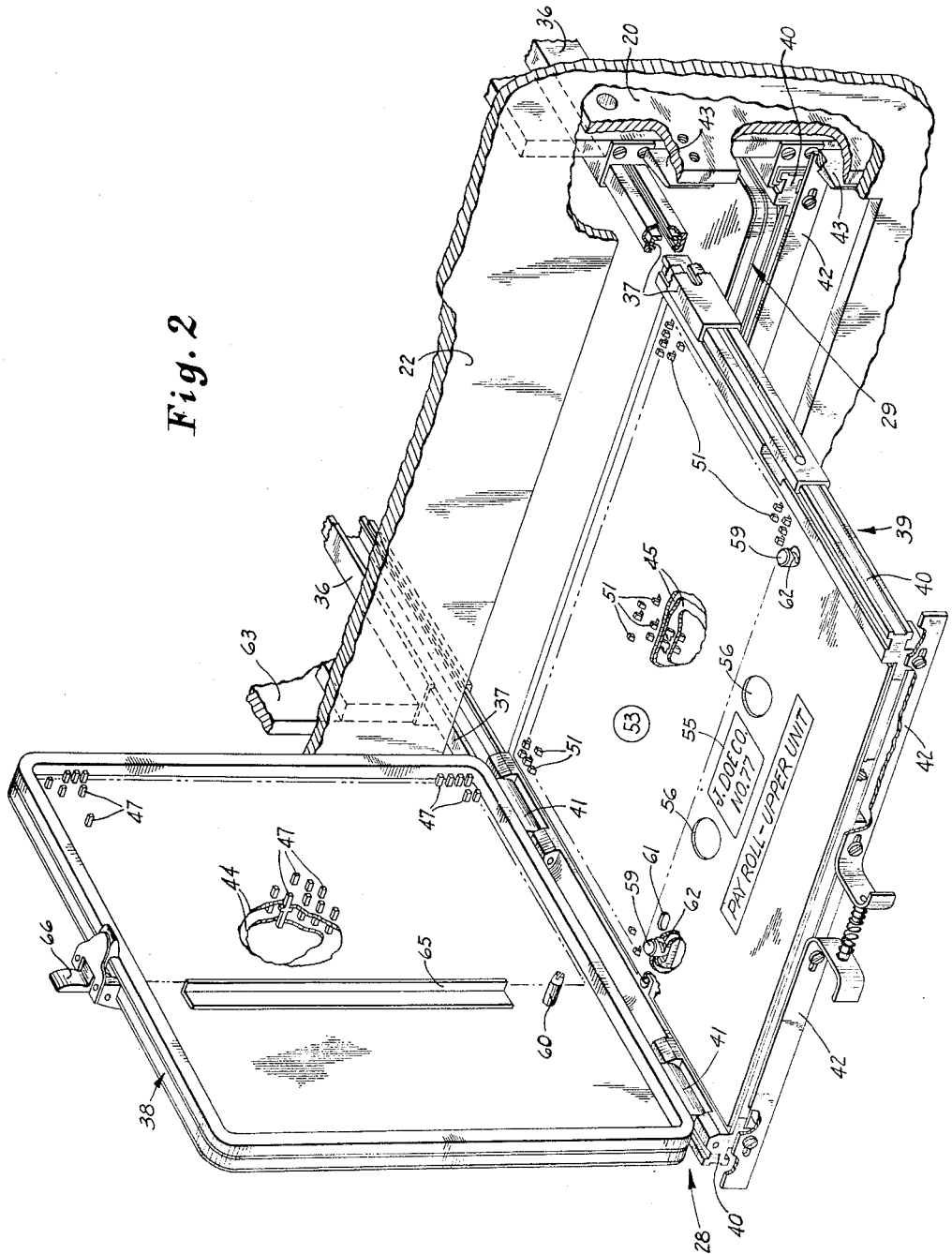
Fig. 2 is an enlarged isometric view, partly broken away and shown in section, of two identical transfer units constructed in accordance with the invention, with one of said units withdrawn from its operative position in the machine and opened, the other or lower of said transfer units being shown in its operative position and capable of similar adjustment.

Each unit is supported in position by the opposed tracks 36 secured to the transverse walls 20 and 63 of the machine frame-work, and slidable in said tracks are the telescoping guide rails 37. The unit is in the form of a carrier comprising upper and lower rectangular frames generally indicated by the numerals 38 and 39, with the latter having grooved end members 40 slidably supported in the rails 37, this sliding construction permitting the carrier to be easily and quickly inserted into operative position within the machine or withdrawn therefrom whenever a change is to be made in the analytical set-up of the unit. For accomplishing such a change, the two frames 38, 39 are hingedly connected at 41 so that the upper frame may be swung from its normally operative horizontal position to the open position thereof, as shown in Fig. 2, thus permitting access to the interior of the unit. To releaseably retain said unit in its operative position within the confines of the machine, the lower frame 39 is provided at the front thereof with the spring-urged sliding latches 42, the outer ends of which engage behind locking lugs, such as the one shown at 43 secured to the wall 20.

The upper frame 38 of each unit is provided with a pair of spaced, superposed supporting plates 44 (Figs. 6 to 9) and the lower frame 39 is likewise provided with similar plates 45, all said plates being stationary within their respective frames. The plates 44 have formed therein a plurality of vertically aligned openings 46 arranged in a number of horizontal rows at least equal to the number of columns in a record card to be analyzed and the number of openings in each row is at least equal to the number of type bars 27, so that each horizontal row of openings is assigned to one column of the card and each transverse column of openings constituted by the various rows is likewise individual to one of said type bars. In each set of vertically aligned openings 46, there is slidably mounted the upper section 47 of a transfer element in the form of a pin provided with lugs 48 engageable with the lower plate to support said section in its normally inoperative position. The lower and upper plates 45 in the bottom frame 39 are similarly provided with an equal number of openings 49 and 50, respectively, vertically aligned with respect to each other and to the openings 46 in the plate 44 when the two frames 38, 39 are in closed or operative position, and in each pair of aligned openings 49, 50 there is mounted for vertical sliding movement the lower section 51 of one of said transfer pins. Each of said sections 51, in addition to being slidably mounted in the plates 45, is designed to have an angular movement with respect to said plates and relative to the associated upper section 47 thereof. For this purpose, the length of the lower opening 49 is made slightly larger than the width of said section 51 while the upper opening 50 is considerably elongated to permit said section to move from a normally angular position relative to its other section to one in direct alignment therewith. In the normal angular position of the section 51 shown in the drawing, which is also its inoperative position, the same is supported upon the lower plate 45 by a lug 52 having a lower edge which extends at an acute angle to said plate so that when the extremity of the lug engages the latter the section will assume its normal angular position until it is adjusted into vertical alignment with its upper section 47.

Figure 6:
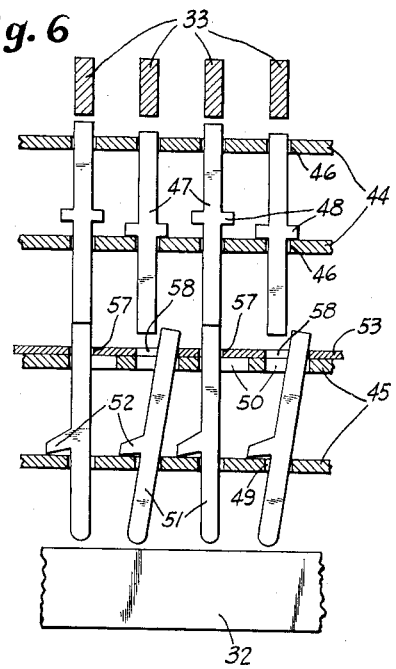
Fig. 6 is an enlarged fragmentary sectional view through the transfer unit, showing certain of the sectional transfer elements in operative position and others thereof inoperative.

After such an adjustment has been made, as will presently appear, and the two frames 38, 39 are restored to their closed or operative positions preparatory to reinserting the transfer unit into the machine, those sections 51 which remain in their angular or inoperative positions, as shown in Figs. 6 to 9, will have their upper ends disposed in overlapping relation to the lower ends of their associated sections 47. By this overlapping of the adjacent ends of the sections 47, 51, the former section constitutes a lock-out for the lower section which will prevent any possible accidental movement thereof toward its operative position which might otherwise be occasioned by the vibration of the machine while in operation, and such lock-out condition prevails whether the sections 51 are in the lower positions thereof, as shown in Fig. 6, or in their vertically actuated positions, illustrated in Fig. 7. It is understood that the invention also contemplates an arrangement in which the normal position of the lower section 51 may be in alignment with the upper section, and that this may be the operative position from which the section 51 can be adjusted to an angular or inoperative position.

This construction of transfer pins in the upper unit 28 makes it possible, as will appear in the course of description, to effect the arbitrary choice and control of movement of any group or groups of type bars 27 to record data from different fields of cards being analyzed, while the similar transfer pins of the lower unit 29 provide for a different control of said type bars, such as the suppression or elimination of one or more groups thereof when no printing operation is to be performed thereby. This latter function is accomplished by the provision of the customary control holes in a card.

*Analysis set-up device*

For use in conjunction with each transfer unit in differentially controlling the positions of the lower sections 51 of the various transfer pins in accordance with a predetermined analysis to be performed by the machine, the invention contemplates a set-up device having the characteristics of extreme simplicity and economy in construction, and capability of being readily and quickly placed in operative position within the transfer unit and withdrawal therefrom when a change-over is to be effected in the operation of the machine, and, in addition to these attributes, the device is such that a number thereof may be stored in a minimum of space when not in actual use. Preferably, said device is in the form of a sheet which may be a thin rectangular plate 53 of metal or other material. In different analytical operations to be performed by the machine, where it is necessary to use only the upper transfer unit 28, there is provided but one device or plate 53 for each job to be accomplished, and where both units 28 and 29 are to be employed, two of said plates are required, one for each transfer unit. Suitable job-identifying indicia 55 (Fig. 2) may be printed or otherwise inscribed on the surface of each plate to enable a machine operator to readily select the proper plate or plates for any particular job, and finger holes 56 are formed in each plate to facilitate the handling thereof.

Figure 7:
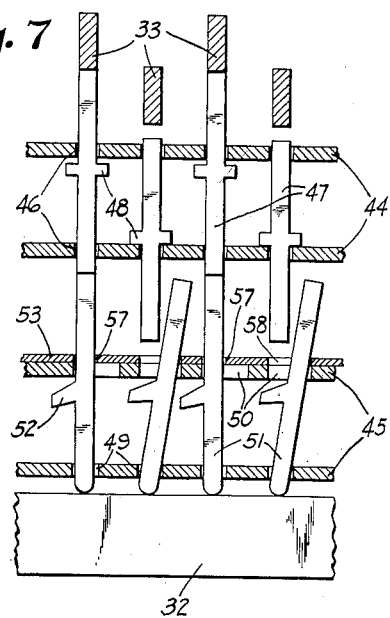
Figure 7 is a view similar to Fig. 6 showing the positions assumed by the sections of both the operative and inoperative transfer elements when the same have been elevated by an analyzer-controlled mechanism to actuate a controlling mechanism for the recording members of the tabulating machine.
Figure 8:
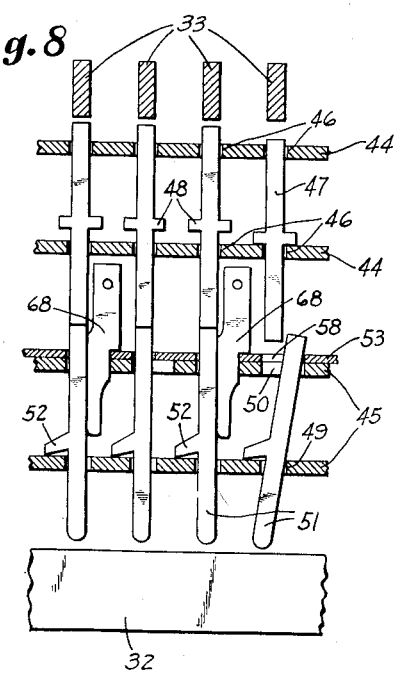
Fig. 8 is a view similar to Fig. 6 illustrating the use of locking lugs which may be employed, in addition to the set-up device, to render operative other transfer elements in addition to those made operative by said device.

Each plate 53, which is fabricated to assist in the performance of one particular analyzing and recording operation, is provided with a plurality of vari-sized openings 57 and 58 equal to the number of transfer pins 47, 51, all said openings being arranged in rows like said pins so that when the transfer unit is opened, as in Fig. 2, and the plate is guided into position in the frame 39 by engagement of the notched guide pins 59 in openings in said plate, the upper ends of the pin sections 51, which are all now in their normal angular positions due to the formation of their lugs 52, will project through said openings and remain in their normal positions until said plate is shifted to variously control the ultimate positions of said sections. The openings 57 are slightly larger than the cross sectional areas of the pin sections 51, while the openings 58 are considerably elongated, and the locations of said openings 57, 58 in the plate are dependent upon the particular machine operations to be accomplished and upon which of the transfer pins are to be utilized in performing said operations. In other words, the openings 57, 58 are formed in the plate in accordance with an analytical set-up in which certain type bars 27 are to be differentially controlled in timed relation to the analysis of the cards so as to record the data transmitted from the card analyzer and through the transfer unit to the controlling mechanisms for said type bars. Thus, as shown in Figs. 6 to 8, the smaller openings 57 are assigned to those pin sections 51 which are to be adjusted into operative or aligned relation to their associated sections 47, while the elongated openings 58 are allotted to those sections 51 which are to remain inactive. With this arrangement, it will be apparent that after the plate 53 has been shifted to the left, as shown in Fig. 6, the sections 51 extending through the smaller openings 57 will, by reason of the engagement of the edges of said openings with said sections, have been rocked about the pivotal lugs 52 to vertical positions. On the other hand, said plate 53 will move relative to the other sections 51, due to the elongated formation of the openings 58, with the result that the latter pin sections will remain stationary in their inoperative positions and will not, therefore, participate in the transmission of data through the transfer unit. With the selected pin sections 51 thus operatively positioned and the upper frame 38 having been lowered to its position on top of the frame 39, the pin sections will assume the relationship shown in Fig. 6 wherein the adjusted sections 51 are in vertical alignment and contact with their associated sections 47, and the inactive sections 51 will be locked out by their upper sections.

The shifting of the plate 53 to the left, as previously described, may be performed by hand, or preferably, this action is accomplished automatically by the closing movement of the upper frame 38. To this end, said frame 38 is provided with a cam 60 in the form of a downwardly projecting pin which enters a recess or opening 61 in the plate 53 as said frame approaches its closing position, and said cam thereupon acts upon said plate to shift the same to the left, the notches 62 in the guide pins 59 then receiving portions of the edges of the openings in the plate through which said pins extend. At the pivotal edges of the frames 38, 39, (see Fig. 5) the latter has recessed therein one or more plungers 63 each backed by a coil spring 64 which normally urges its plunger outwardly. As the plate 53 is shifted to the left, it engages the plungers 63, forcing the same inwardly to place the springs 64 under compression so that when the frame 38 is lifted preliminary to withdrawing the plate 53, the springs 64 will cause their plungers to urge said plate to the right to disengage it from the notches 62 in the pins 59 and thus permit the plate to be lifted from the frame 39. When the frames 38, 39 are closed, with a plate 53 therein, an angle bar 65 carried by the frame 38 will be disposed directly above and in close proximity to or light contact with said plate to prevent it from becoming accidentally displaced while the machine is in operation. The frames 38 and 39 are held in their operative position by means of a spring pressed latch 66 pivoted to the frame 38 on the edge thereof opposite the hinged connection between said frames and said latch is adapted to engage a pin 67 carried by the lower frame 39.

When a plate 53 is in operative position in a transfer unit and it is desired to make slight alterations in the operating set-up by rendering active sections 51 in addition to those which have been adjusted by said plate without removing and replacing the latter, this may be done, as illustrated in Fig. 8, by first lifting the frame 38 and then engaging one or more locking lugs 68 with a like number of previously inactive and diagonally disposed sections 51 and then inserting said lugs through the elongated openings 58 and 50 through which said section or sections extend. The placing of the lug 68 in position will adjust the section 51 to its vertical position where it will align with the associated section 47 to render the transfer pin active to perform its desired operation.

Figure 9:
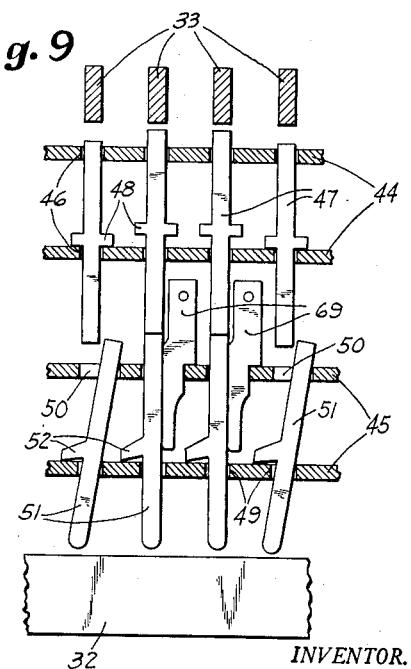
Fig. 9 is a sectional view, similar to Fig. 6, illustrating a modification in which the use of the set-up device is dispensed with, and locking lugs, such as shown in Fig. 8, are employed to individually adjust sections of predetermined transfer elements to their operative positions.

In the modified form of the invention shown in Fig. 9, use of the plate 53 is dispensed with entirely and, in lieu thereof, locking lugs 69 similar to the lugs 68 are inserted into the elongated openings 50 in the plate 45 through which extend those sections 51 of the transfer pins that are desired to be adjusted to their operative positions in alignment with their upper sections 47, the selection and locking up of such pin sections 51 being made in accordance with the operations desired to be performed by the machine.

In cooperation with the upper transfer unit 28, there is employed a cross bar arrangement (see Figs. 6 to 9, and 19) in which is provided a lower set of actuating bars 32 forming part of an analyzer-controlled mechanism, and in which each one of said bars 32 is individual to a column of the cards to be analyzed and extends parallel to the line of type bars and is disposed directly beneath one of the longitudinal rows of transfer pins. The aforesaid cross bar arrangement is completed by an upper set of bars 33 each located directly above a transverse column of transfer pins for actuation thereby. These bars 33 form part of the mechanism for controlling the type bars 27 and extend transversely to the bars 32, and each bar 33 is assigned to one of said type bars. By the crossed arrangement of said bars 32, 33, the planes of intersection between the bars of the upper and lower sets define junction points at which the above described transfer pins are located for the establishment, by those pins which are in active position, of operating connections between said lower and upper sets of bars. Thus, it will be seen, as in Fig. 7, that when the lower bar 32 is raised, in a manner to be described, the activated pins which are engaged by said bar will also be raised, thus causing them to impart a similar movement to the associated bars 33. When the bar 32 is restored, the operated transfer pins will drop by gravity to their normal positions and thus permit the upper bars 33 to also return to normal.

A door 70, or other closure member, may be provided in the front wall of the casing 22 to fully enclose the transfer units 28, 29 in their operative positions within the machine.

*Card feed*

As shown in Fig. 13, the machine is driven by a suitable means such as the motor 71 coupled to the primary shaft 72 through the pulley 73 and clutch 74 which may be of any conventional design. Said shaft extends along the rear wall 75 of the main frame 21 and has a worm 76 thereon which drives the gear 77 keyed on the cam shaft 78 (Fig. 14) rotatable in bearings 79 in the rear and front walls 75 and 80 and operable to control the various functions of the analyzer section, as will appear in the course of the description.

The cards stacked in the magazine 23 are fed therefrom by the reciprocating picker 81 operated by the crank connection 82 secured on the rock shaft 83 which, through the crank 84 is connected to one end of the link 85 the other end of which is secured to the bell crank 86 having a follower thereon engaging with the cam 87 on the shaft 78. As cards pass from the magazine, they are carried along by the pairs of feed rollers 88 into the card chamber 89 of the analyzer unit 24 where they are stopped for analysis of the designating data thereon and thereafter fed from the analyzer by the rollers 90 and finally discharged into the compartment 26 by the rollers 91. To drive the feed rollers 88 (Fig. 14) nearest the analyzer unit 24, the lower roller of said pair has its shaft geared to the worm 76 and carries a spur gear 92 thereon which meshes with a similar gear 93 on the shaft of the upper roller. The rollers of the other pairs 88 are similarly geared to each other and also to the shaft 72 by worms 94 (Fig. 13). The shaft of the lower roller of the first mentioned pair extends through the front wall 80 (Fig. 14) and carries a gear 95 that meshes with a worm 96 on the secondary drive shaft 97 suitably mounted in bearings on said front wall, and said shaft 97 may carry worms 98 (Fig. 12) as additional drives for the lower rollers 88 of the three pairs next adjacent the analyzing unit. The sets of rollers 90 within the analyzer unit, which are of narrow width and engage only the ends of the cards and whose shafts do not extend all the way across from wall 75 to wall 80, are driven in turn from the shaft 72 by worms 99 (Fig. 13) and from the shaft 97 by worms (not shown) similar to the worms 98 on the latter shaft. Finally, the discharge rollers 91 are coupled together the same as the pair of shafts shown in Fig. 14 and are driven by the worm 100 on said shaft 72.

*Analyzer unit*

The unit 24 is, generally, of a construction well known in the art and comprises a lower, vertically reciprocating pin box 101 located below the card chamber 89 and containing a plurality of sensing pins 102, one for each index point on the cards to be analyzed. The box 101 is mounted on a casting 103 and is guided in its vertical movements by the connected sleeves 104 slidable on standards 105 mounted upon the base of the frame 21. To reciprocate the pin box, the shaft 78 has secured thereto the eccentric 106 which is coupled at 107' to the connection between said sleeves 104.

The unit 24 further comprises a stationary upper pin box 107 disposed above the card chamber 89 and having upper and lower plates 108 and 109 in which are slidably mounted for vertical movement the analyzing pins 110 the upper ends of which normally project above the plate 108. Similarly mounted in said upper box 107 is a group of control pins 111 shorter than the pins 110 and each assigned to one column of a card and utilized in connection with the control or X position at the head of each column. Each control pin is provided with a lateral extension 112 which projects through the adjacent wall of a pin box and is utilized, as will later appear in more detail, to control the actuation of one of the bars 34 associated with the lower transfer unit 29, previously described. All of the pins 110, 111 are vertically aligned with corresponding sensing pins 102 in the lower pin box and each column of said pins 110, 111 has associated therewith a lock plate 113 having its ends slidably mounted in and projecting through the walls of the pin box 107. Each plate 113 is provided therein with a series of L-slots 114, one for each of the pins 110 in the associated column, and a U-slot 115 for the single control pin 111 in said column, and each of said pins has a stud 116 projecting into its respective slot. The extent of sliding movement of the lock plate 113 is variable. If only a pin 110 of any one column is elevated by its associated sensing pin 102, the stud 116 on said pin 110, after being raised, will enter the short leg of its L-slot upon movement of said lock plate and will thus confine said movement to its shorter distance, and the same is true if the control pin 111 is raised along with said pin 110. However, if only the control pin 111 is elevated, its stud 116 will enter the long leg of the U-slot 115 and thus permit the plate 113 to move a greater distance to the right. The control of said lock plate and the results of its variable movements will appear in the course of the description.

As a card enters the chamber 89 preparatory to being analyzed by the upward movement of the lower pin box 101, a vertically movable card stop 117 is in its lower operative position, as shown in the drawings, so as to be engaged by the leading edge of the card which is thus brought to a temporary standstill while the pins 102 sense the card for perforations in the various columns thereof. Immediately upon retraction of said sensing pins, the card stop 117 is raised to permit the rollers 90 to feed said card from the analyzer unit to the discharge rollers 91. As best shown in Figs. 15 and 16, the mechanism for operating the card stop 117 is controlled from a cam 118 on the shaft 78 which becomes effective, immediately upon retraction of the sensing pins 102 from the card chamber 89, to rock the lever 119 about its pivot to exert a downward pull upon the link 120 against the tension of the spring 121 connected to said lever. The upper end of the link 120 is connected to a crank arm 122 mounted upon a rock shaft 123 having bearings in the upper side plates 126 secured to and forming part of walls 75 and 80. Two other crank arms 124 are secured on said rock shaft and have connected to their lower ends the links 125 which extend to the left and are guided for sliding movement by plates 127 (see Fig. 14) forming walls of the upper pin box 107 and secured to castings thereof. The left ends of said links 125 project through the left hand wall of said upper pin box and are provided with diagonal slots 128 each receiving a pin 129 carried by a bracket formed on the vertically slidable plate 130 mounted upon the adjacent wall of said pin box. Through the linkage just described, it will be apparent that when the cam 118 becomes effective to rock the lever 119, a leftward sliding movement will be imparted to the links 125 with the result that the pins 129 will ride upwardly in their respective slots so as to elevate the plate 130 and thus raise the card stop 117 carried thereby, whereupon the rollers 90 become effective to feed the analyzed card from the chamber 89 following which the card stop again returns to its normal position.

The variably movable lock plates 113 for the analyzing and control pins 110, 111 are under the dual control of a plurality of spring-urged bell crank levers 131 (see Fig. 17), one for each lock plate, and the common bail 132. Said bail is moved to the right, as viewed in Figs. 10 and 12, immediately following the elevation of any of the pins 110, 111, and when said bail is thus operated the levers 131 are rocked counterclockwise by their springs to cause their lower ends to move the respective lock plates 113 to the right a variable distance depending upon which of the pins 110, 111 have been raised. The studs 116 of the elevated pins will enter the upper portions of their respective slots 114, 115 and the pins will thus be locked in their raised positions preparatory to controlling two different mechanisms which, in turn, control the transmission of analyzed data to the transfer units 28 and 29, as will later appear. Said bail 132 is carried by two slides 133 arranged alongside of the links 125 and guided by the plates 127 (Fig. 14). The right ends of said slides 133 are connected to the crank arms 134 secured on the rock shaft 135 having bearings in the side plates 126. Said shaft is further provided with another crank arm 136 to which is connected the upper end of the downwardly extending link 137 (Fig. 17) the lower end of which is joined to the bell crank lever 138 controlled by the cam 139 on the shaft 78. In the cyclic operation of the machine, cam 139 maintains the bail in its right hand position until the data on the cards has been transmitted to the transfer units 28, 29, whereupon said bail is restored to shift the lock plates 113 and levers 131 to their normal positions. This action of lock plates releases the pins 110, 111 which then restore to await the next analyzing operation.

Analyzer scanning device

The elevation and locking of a plurality of the analyzing pins 110 in the different columns of the pin box 107 is immediately followed by the right hand movement of a scanning device generally indicated at 140 (Figs. 12 and 18) which continuously reciprocates over said pins. Said device is provided with a plurality of operating elements in the form of sensing pawls 141, one for each column of pins, which are adapted to contact and be raised by the locked pins in the respective columns to initiate the operation of one of the aforementioned controlled mechanisms that is associated with the upper transfer unit 28, whereby the analyzed data represented by said locked pins is transmitted to the bars 32 forming part of said mechanism and associated with said unit. Briefly, it is noted at this point that the elevation and locking of any one of the control pins 111 has no effect, because of its shorter length, upon the associated pawl 141, except when said pin is the only one in its column that is in operative position, as will later appear more clearly.

The scanning device comprises a frame consisting of side rails 142 and 143 connected by the end plates 144 to complete the frame proper. Each plate 144 is provided with a reduced extension 145 that terminates in a down turned lug 146 to which is connected the mechanism, presently to be described, for reciprocating said frame. The extension 145 projects outwardly between spaced bars 147 mounted upon the upper edges of the side plates 126 and constituting trackways in which the scanning frame moves longitudinally. Guide strips 148 are secured to the extensions 145 on opposite sides of and engage the upper bars 147 of the trackways to further guide said scanning frame and prevent lateral shifting thereof during its reciprocating movements. The lower edge of the bar 142 has secured thereto a comb 149 for guiding the pawls 141 in their pivotal movements, and said pawls are pivotally suspended from said bar by means of a bracket 150 carrying a pivot rod 151 extending through said pawls. Springs 152 (Figs. 10 and 12) connect the pawls 141 with a comb plate 153 secured to the rear face of the rail 142 so as to yieldably maintain the forward ends of the pawls in a depressed condition whereby the lower inclined edges thereof will engage the locked pins 110 as the scanning device progresses through its initial or forward movement during which said pawls will, as they are raised by said pins, operate the controlled mechanism above mentioned. The forward ends of the pawls 141 are prevented from dropping down upon the upper ends of the pins 110 by stop pins 154 (Figs. 12 and 18) on said pawls which engage with the comb 149.

The reciprocation of the scanning frame is controlled from the cam shaft 78 by means of two pairs of complementary cams 155 secured on opposite ends of said shaft (Fig. 14). On opposite sides of each pair of cams there are fulcrumed at 156 and 157 (Fig. 12) the pairs of short and long levers 158 and 159 connected by a spring controlled link 160 pivoted to the levers 158 at their upper ends, and to the levers 159 intermediate their ends. The pair of levers 158 carries a roller 161 engageable with one of the cams 155 and the levers 159 carry a roller 162 engageable with the other or complementary cam so that as the two sets of cams at opposite ends of the shaft are rotated the leverage described will be oscillated about said fulcrums 156, 157. The upper ends of the two pairs of the levers 159, on opposite sides of the machine, are connected by the links 163 to the lugs 146 of the scanning frame so that the oscillating movement of said leverage will be translated into a reciprocation of said frame. The return or secondary movement of the scanning frame restores the operating pawls 141 to their initial positions and follows the restoration of the locked pins 110 to normal when they are released by the unlocking movements of the plates 113 under the influence of the bail 132. Said secondary movement of the scanning frame is also utilized, as will presently appear, to restore the data transmitting mechanism which is operated during the primary movement of said scanner.

First analyzer controlled mechanism

This mechanism, which is utilized to transmit data from the analyzing pins 110 to the actuating bars 32 associated with the upper transfer unit 28, is operated by the sensing pawls 141 of the scanning device and comprises a plurality of slides 164 each individual to one of said pawls and provided along its lower forward edge with rack teeth 165 one of which is adapted to be engaged by the forward end of its pawl as the latter travels along and is elevated by one of the pins 110. The slides 164 are supported at their left ends upon the upper edge of rail 142 of the scanning frame and engage between the teeth of the comb plate 153. The forward ends of the slides 164 are supported upon a fixed bar 166 mounted between the side plates 126 and carrying a comb plate 167 for said forward ends. For each slide 164 there is provided a lever 168 pivoted intermediate its ends upon a rod 169 mounted in the extension plates 170 secured to the plates 126, and guided in its movement about said pivot by a comb 171. The forward end of each lever 168 carries a disc 172 normally engageable in a recess 173 formed in the upper edge of its slide 164, while the opposite end of said lever has a pin 174 engageable with one extremity of an operating bell crank 175 the other extremity of which contacts the adjacent end of an associated actuating bar 32 of the transfer unit 28.

In operation, as the scanning frame 140 advances and carries with it the various pawls 141, it will move relative to any particular one of the slides 164 until the pawl 141 individual to said slide is elevated by engagement with one of the pins 110, whereupon said pawl is engaged with one of the rack teeth 165 of said slide depending upon the position of the operated pin 110. Further advancement of the scanning frame carries the engaged slide with it and, as a consequence, the disc 172 of the associated lever 168 is disengaged from its recess 173, thereby elevating the right end of said lever and depressing the pin 174 at its left end so as to rock the associated bell chank 175 in a clockwise direction to thereby shift the actuating bar 32 to the left. The engagement of the pawl 141 with a tooth 165 of its slide 164 is maintained while the inclined surface of said pawl is passing over the locked pin 110 and this engagement is of sufficient duration to remove the disc 172 from its recess so that the lever 168 will be rocked, after which the pawl 141 will restore to normal under the influence of its spring 152. With the end of the forward movement of the scanning frame reached, all of the locked or operated pins 110 will have actuated their respective pawls 141 with the result that the corresponding bars 32 of the transfer unit 28 will have been shifted to the left by the associated bell cranks 175. Thereupon, the frame 140 starts its return movement and, in so doing, the rail 142 thereof will progressively engage the lips 176 formed on the rear ends of the variously advanced slides 164 and thus return said slides to their normal positions, whereupon the discs 172 of the various levers 168 will re-enter their recesses 173 under the influence of the springs 177 (Figs. 11 and 19) connected to the bars 32, which springs shift said bars to the right to rock the associated bell cranks 175 counterclockwise and thereby elevate the right ends of the levers 168. It is during the interval between the initial operation of the bars 32 and their restoration, that the transfer unit 28 becomes effective to control the extent of movement of the various type bars 27, as will later appear in more detail.

*Second analyzer controlled mechanism*

This is the mechanism associated with the lower transfer unit 29 by means of which the latter accomplishes the suppression or elimination of type bars 27 in accordance with the selective positioning of the transfer pins 47, 51 in said unit, and said mechanism is activated by the elevation and locking up of one or more of the control pins 111 of the upper pin box 107. The unit 29 is effective to suppress certain preselected type bars either when a control hole appears in the same column with another punched index point, or when said hole is punched in a column wherein no other point is perforated. In the former event, the elevation and locking of the control pin 111 assigned to the particular column under consideration will not interfere with the usual sensing operation of the associated pawl 141 described above, and the latter will therefore move to engage the locked pin 110 in said column and thus operate the slide 164 with the results already set forth. This operation of the pawl is possible because of the fact that the associated lock plate 113 is permitted to move only a limited distance due to the entrance of the stud 116 on the then locked pin 110 into the short leg of the L-slot 114 in said plate. However, when only a control hole is punched in a column, and consequently only the corresponding control pin 111 is elevated, the associated lock plate 113 will be permitted to move to its extreme right hand position under the influence of its lever 131 because the stud 116 of said pin 111 will then be allowed to fully enter the long upper leg of U-slot 115 in said plate. This latter movement of the lock plate permits the associated lever 131 to rotate sufficiently for its upper end to immediately engage and raise the pawl 141 before it has started its travel to the right. Said pawl thereupon engages the first tooth 165 of its slide 164 which is then carried along by the scanning frame. In so doing, the lever 168 is rocked to actuate the associated bar 32 of the transfer unit 28 but, if no transfer pins have been rendered operative over said bar 32, its actuation will have no effect upon the cross bars 33 of said transfer unit. Therefore, all the type bars, with the exception of those which are to be suppressed, will be impelled upwardly, in a manner to later appear, until they have reached the extreme limit of their movement in which position the lowermost type in said bars will have passed beyond the hammers for operating same and, consequently, no printing operation will be effected.

Returning now to the point at which the control pin 111 is raised by the sensing of a hole at the X position of a card, it will be seen that as said pin starts its upward movement toward its locked position, the extension 112 thereof immediately rocks the associated spring controlled interposer lever 178 (Figs. 12 and 20) forming part of the second analyzer controlled mechanism and pivotally supported in a bracket 179 suspended from the bail 180 common to all said levers 178 and which is rockingly supported on the shaft 181 extending between the upper side plates 126. When the lever 178 is rocked, its left end is lowered to align itself with the associated actuating bar 34 associated with the lower transfer unit 29. Immediately upon locking said control pin, the bail 180 is swung to the left, in a manner to presently appear, carrying all of the levers 178 with it. The left ends of those levers which have not been rocked by a control pin will pass over their respective bars 34, but the actuated lever which is now aligned with its bar 34 will shift the latter to the left to accomplish the operation of transfer unit 29 and consequent suppression of the preselected type bars. The immediate operation of said bail following the locking of control pin 111, and even before the scanning device starts its primary movement, is to enable the accomplishment of the suppression of said type bars before they start their upward travel in predetermined timed relation to the movement of said scanning device.

The bail 180 is controlled from the shaft 78 which carries a cam 182 (Fig. 14), and this cam is engaged by one end of the bell crank 183 (Fig. 12) the other end of which is pivoted to the lower extremity of a link 184 the upper end of which is connected to the crank 185 secured on the rock shaft 181. The high portion of the cam 182 causes the bell crank 183 to exert a downward pull upon the link 184 so as to rotate the shaft 181 in a clockwise direction and thus swing the interposer 178 to the left to actuate its bar 34.

*Basic type bar control*

The manner in which the actuating bars 32 and 34 associated with the two transfer units 28 and 29 are operated by the card analyzer, has now been described. Before proceeding with the description of the results obtained by the actuation of said bars, the basic control of the type bars 27, which generally is of a conventional design, will be set forth. Said type bars are normally urged upward by springs 186 (Fig. 21) and are returned to their lowermost positions by the common restoring bail 187 which reciprocates vertically in synchronism with the action of the action of the analyzer scanning device. The drive for said bail originates at the shaft 72 (Fig. 13) the right hand end of which extends through the wall 20 of the main framework and carries the bevel gear 189 meshing with a similar gear 190 on the upper end of the diagonal shaft 191. At the lower end of said shaft (Fig. 21), a worm 192 drives a gear 193 on the shaft 194 journaled in the walls 20 and 63 and which also carries internal cams 195 for operating the levers 196, fulcrumed at 197 and connected to the lower ends of the links 198. The upper ends of said links are joined to the brackets 199 to which the bail 187 is secured and, through this linkage and the shape of the cams 195, the bail is reciprocated in such manner that when it reaches the extreme of its upward movement it will dwell while the type is being operated to print on the sheet 54 carried on the platen 25, and will then start its return movement during which it will restore the type bars. The paper feed mechanism for the sheet 54 and the platen operating mechanism (not shown) may be of any standard construction well known in the art.

Type bar control by upper transfer unit

Referring now to Figs. 19 and 21, it will be seen that when anyone of the actuating bars 32 is moved to the left, as viewed in Fig. 19, by the action of its associated lever 175, said bar will also be urged upwardly by the engagement of the stationary rods 200 in the diagonal recesses 201 formed in the lower edge of said bar. This coordinate movement of the bar elevates the activated pin or pins resting thereon and each pin will thus operate its associated cross bar 33 while the lower sections 51 of the inactivated pin will move upwardly relative to the upper sections 47 thereof. The bars 33 are supported for coordinate movements in a frame 202 (Fig. 21), under the influence of said activated transfer pins. To produce such movements, each bar 33 is connected at spaced points to links 203 mounted upon rods 204 carried in said frame 202 so that as a transfer pin is raised it will swing its bar 33 upwardly about the pivot 204 so as to disengage its left end from the upper extremity of the associated type bar-control pawl 205. This action takes place at the instant when the proper tooth 206 of the type bar 27 is in position to be engaged by the lower extremity of the pawl 205 under the influence of its spring 207 so that said type bar will be arrested in its upward movement preparatory to the printing of the character corresponding to said tooth. The upper portion of each link 203 is provided with a notch 208 in which is engaged a pin 209 on the bar 210 which is slidable in the frame 202. A coil spring 211 at one end of the bar 210 is compressed by the action of the bar 33 just described and later acts to restore said bars 33 and 210 upon full restoration of the pawl 205 at the conclusion of the restoring movement of the type bar bail 187.

Type bar control by lower transfer unit

The unit 29 becomes effective when one or more of the interposer levers 178 is tripped by the associated extension 112 on a control pin 111, followed by the operation of the bail 180 and the consequent shifting to the left of one or more of the actuating bars 34 against the action of the springs 212 (Fig. 20), all of which occurs before the type bar bail 187 starts is upward movement. As a bar 34 over which an activated transfer pin is located, is shifted to the left, it is also raised by the engagement of the stationary rods 213 in the diagonal recesses 214 in said bar, thus elevating said pin to impart a similar movement to the cross bar 35 directly above said pin. Said bars 35, like the bars 33, are supported in a frame 215 (Fig. 21) and suspended by links 216 similar to the links 203. Like the latter, the links 216 are connected by a spring controlled bar 217 which has the same action as the bar 210. As the cross bar 35 is raised, its left end disengages from its associated type bar-control pawl 218, permitting the same, under the influence of its spring 219, to engage the tooth 220 at the lower extremity of the associated type bar 27, thus preventing said type bar from rising under the influence of its spring 186 when the bail 187 starts its upward movement.

Upon the conclusion of the printing cycle, later to be described, the restoring bail 187 starts its downward movement and carries with it all type bars which have been raised to printing position and when the latter have been restored, the bails 221 and 222 (Fig. 23), common to all pawls 205 and 218, respectively, will operate to fully disengage said pawls from their teeth 206 and 220, and the parts will then be in position to start another cycle of operation. The bail 221 extends between and is secured to two actuating members 223 (see also Fig. 22) having a sliding movement on the stationary cross bar 224 the ends of which are secured to the opposed rails 62 provided with slots 224' for receiving the ends of said bail. An end of one of said members 223 is provided with a depending extension 225 utilized to couple said member with the upward extension 226 of one of the actuating members 227 for the lower bail 222, the latter members being also slidable on a fixed cross bar 228 supported in the same manner as the bar 224. Thus, sliding movement imparted to the members 223, and consequently to the bail 221, will also be transmitted to the members 227 to similarly actuate the bail 222. The members 223 and the connecting bail 221 are operated from a shaft 229 which carries the complementary cams 230 each engageable with a different follower 231 carried on the bell crank 232 mounted on the rock shaft 233. Said bell crank 232 is connected, by a link 234, to one of the bail actuating members 223 the other of which is joined, by a link 235 (Fig. 22), to said rock shaft 233.

The shaft 229 is driven from the shaft 72 (Fig. 13) by means of bevel gears 236 one of which is secured on said shaft 72 and the other carried by the lower end of a vertical shaft 237 which drives the bevel gears 238 to rotate the shaft 239 (Fig. 22) having a worm 240 thereon meshing with the gear 241 on said shaft 229.

Printing mechanism

This mechanism, generally, is of a construction well known in the art, and comprises a hammer 242 for each type bar pivotally mounted upon a rod 243 and urged toward its operative position by a spring 244 so that when the hammer is released it will strike a spring plunger 245 to operate the then opposed type of the associated bar 27. Each hammer 242 is normally held in its inoperative position by a sliding latch 246 which is under the control of a pivoted hammer lockout lever 247. The latter is vertically adjustable, manually, to an inoperative position when it is desired to disable any associated hammer 242 by preventing its latch 246 from being actuated by the common operating bail 248. When a lever 247 is thus moved to a raised or inoperative position it is held thusly by a spring latch 249. In its lower or operative position, the lever 247 is adapted to be contacted by the bail 248 when the latter is swung to the right, as viewed in Fig. 21, and this contact slides the latch 246 out of the path of the hammer to permit the same to operate its plunger 245 under the influence of the spring 244. Thereupon, a common restoring bail 250 is operated to return all of the actuated hammers to their normal positions where they are re-engaged by their latches 246.

The operating bail 248 is controlled from the shaft 229 which has secured thereon a cam 251 that, at the proper moment, actuates a follower 252 on one end of a bell crank 253, the other end of which is connected to a link 254 connected to said bail 248.

The restoring bail 250 is also controlled from the shaft 229 by a cam 255 thereon which engages a follower 256 on the bell crank 257 connected by link 258 to the bail 250 so as to swing the latter to the right and thus restore the hammers 242. A spring 259 connects the bell crank 257 with a stationary part of the machine so as to return the link 258 and the bail 250 to normal position after the hammers have been restored and also maintain the follower 256 in engagement with its cam.

What is claimed is:

1. A transfer unit for the transmission of data from the analyzer of a tabulating machine to recording members thereof, said unit comprising a carrier insertable between said analyzer and recording members and including cooperating frames, a plurality of cooperating sectional transfer elements the sections of each of which are movably supported in different frames and the sections in one of said frames having normal positions relative to cooperating sections in the other frame, and a set-up device insertable between said frames and having means to alter the normal positions of certain of said sections relative to their cooperating sections.

2. A transfer unit for the transmission of data from the analyzer of a tabulating machine to recording members thereof, said unit comprising a carrier insertable between said analyzer and recording members and including cooperating frames, a plurality of sectional transfer elements the sections of each of which are movably supported in different frames and the sections in one of said frames having normal and operative positions relative to sections in the other frame, a plate insertable between said frames and movable relative thereto, said plate having means operable upon relative movement thereof to shift certain of the first named sections from normal to operative positions relative to their cooperating sections, and means on one of said frames engageable with said plate for moving the same.

3. A transfer unit for the transmission of data from the analyzer of a tabulating machine to recording members thereof, said unit comprising a carrier insertable between said analyzer and recording members and including cooperating frames, a plurality of sectional transfer elements the sections of each of which are movably supported in different frames and the sections in one of said frames having normal positions relative to sections in the other frame, and a plate insertable between said frames and movable relative thereto to alter the positions of certain of the first named sections, said plate having vari-sized openings therein through which said first named sections extend for cooperation with the sections in said other frame, the size of said openings determining which of said first named sections are to have their positions altered.

4. A transfer unit for the transmission of data from the analyzer of a tabulating machine to recording members thereof, said unit comprising a carrier insertable between said analyzer and recording members and including cooperating frames, a plurality of sectional transfer elements the sections of which are movably supported in different frames and the sections in one of said frames having temporarily inoperative positions relative to the sections in the other frame, and a plate insertable between said frames and movable relative thereto, said plate having means operable upon said movement thereof for shifting certain temporarily inoperative sections to operative positions relative to their associated sections while leaving others of the former sections in their inoperative positions.

5. A transfer unit for the transmission of data from the analyzer of a tabulating machine to recording members thereof, said unit comprising a carrier insertable between said analyzer and recording members and including relatively movable frames, a plurality of sectional transfer elements the sections of each of which are movably supported in different frames and the sections in one of said frames having certain positions relative to the sections in the other frame, means to shift certain of the former sections to other positions relative to the latter sections, and means controlled by a relative movement between said frames for operating the last named means.

6. A transfer unit for the transmission of data from the analyzer of a tabulating machine to recording members thereof, said unit comprising a carrier insertable between said analyzer and recording members and including pivotally connected frames, a plurality of sectional transfer elements the sections of each of which are movably supported in different frames and the sections in one of said frames having means for temporarily positioning the same in angular relation to associated sections in the other frame, means movably mounted between said frames for shifting certain of said angularly positioned sections into positions in alignment with their cooperating sections in the other frame, and means carried by one of said frames operable upon relative pivotal movement between said frames for moving the last named means.

7. A transfer unit for the transmission of data from the analyzer of a tabulating machine to recording members thereof, said unit comprising a carrier insertable between said analyzer and recording members and including pivotally connected frames, a plurality of sectional transfer elements the sections of each of which are movably supported in different frames and the sections in one of said frames having means for preliminarily positioning said sections in angular relation to associated sections in the other frame, a plate insertable between said frames and movable relative thereto, said plate having vari-sized openings through which said angularly positioned sections extend for cooperation with associated sections in the other frame, and means on said other frame operable when the latter is moved about its pivotal connection with the first named frame to shift said plate to thereby align certain of said angularly positioned sections with their cooperating sections while leaving others of the former sections in their angular positions.

8. In combination, a record card analyzer including analyzing elements assigned to each column of a card being analyzed and actuated by the presence of punched index points in said cards, a scanning device associated with said analyzing elements and including an operating element for each card column actuated by any one of said analyzing elements assigned to said column, means to produce relative movement between said scanning device and analyzing elements to actuate said operating elements, a plurality of sectional transfer elements controlled by each of said operating elements, one section of each transfer element being normally inoperative relative to its associated section, a set-up device cooperating with said transfer elements and having means to adjust certain of said normally inoperative sections into operative relation with their associated sections while leaving others in their inoperative positions, a plurality of recording members, and means operated by the transfer elements whose sections are in operative relation for controlling said recording members.

9. In combination, a recording mechanism, a card analyzer, data transmitting means controlled thereby, groups of crossed members defining junction points therebetween with one of said groups operatively connected to said transmitting means, a plurality of sectional transfer elements at said junction points for forming operative connection between the crossed members at said points, a section of each of said transfer elements being movable to positions in and out of cooperative relation with the other section thereof, means to move certain of the first named sections into cooperative relation with their associated sections for the control of crossed members in the other of said groups while leaving others of said first named sections out of cooperative relation, and means operated by the last named crossed members for controlling said recording mechanism.

10. In combination, a record card analyzer, means controlled thereby for transmitting data from cards in said analyzer, a plurality of actuating elements responsive to said controlled means and each individual to a column of a card being analyzed, a plurality of recording members, a plurality of control elements for said recording members arranged with respect to said actuating elements in such manner as to define junction points therebetween, a plurality of sectional transfer elements positioned at said junction points with the sections of said elements normally out of cooperative relation with each other, and means to effect cooperative relation between sections of certain of said transfer elements for operatively connecting the actuating and control elements at certain of said junction points.

11. In combination, a record card analyzer, data transmitting means controlled by said analyzer, a plurality of aligned type bars, a series of actuating elements each individual to a card column and extending in parallel relation to the line of said type bars for movement by said transmitting means, a series of movable control elements for said type bars each individual to one of them and extending in crossed relation to said actuating elements, a transfer unit for establishing operative connection between said actuating and control elements and comprising carrier frames, a plurality of sectional transfer elements the sections of each of which are supported in different frames and one of said sections being movable to positions in and out of cooperative relation with its associated section, and a set-up device insertable between said frames in association with said movable sections and having means to move certain of them while leaving the others stationary.

12. In combination, a record card analyzer, data transmitting means controlled by said analyzer, a plurality of aligned type bars, a series of actuating elements each individual to a card column and extending in parallel relation to the line of said type bars for movement by said transmitting means, a series of movable control elements for said type bars each individual to one of them and extending in crossed relation to said actuating elements, a transfer unit for establishing operative connection between said actuating and control elements and comprising relatively movable carrier frames, a plurality of sectional transfer elements the sections of each of which are supported in different frames and one of said sections being movable to positions in and out of cooperative relation with its associated section, a set-up device insertable between said frames in association with said movable sections after said frames are relatively moved in one direction and having means to move certain of said sections while leaving others stationary, and means activated by a relative movement of said frames in another direction for operating said device to adjust said movable sections.

13. In a tabulating machine, in combination, an analyzer for sensing perforations in record cards, a plurality of recording members controlled in accordance with the analysis of said cards, means including a plurality of sectional transfer elements for transmitting data from said record cards to said recording members, certain sections of said transfer elements having normally tilted positions relative to their associated sections and being movable to operative positions in alignment with the latter sections, and a set-up plate common to all said cards for moving selected ones of said tilted sections from normal to operative positions and having openings therein of different sizes through which said tilted sections extend, said openings each identifying a particular recording member solely by the location of the opening in said plate and designating the selected tilted sections to be moved by the size of said openings.

14. A transfer unit for the transmission of data, said unit comprising a mounting means including a plurality of superposed plates having aligned openings therein with the openings in one of said plates of greater area than those in the remaining plates, a plurality of sectional transfer elements each having a section thereof mounted in the openings in certain of said plates for linear movement only, and the other section of each of said elements extending through a large opening in the first named plate and having means engageable with another of said plates and cooperating with the large opening through which said other section extends to normally maintain the latter in angular relation to the first named section, and means to adjust said other section from its angular position to an operative position in alignment with said first named section.

15. A transfer unit for the transmission of data, said unit comprising a mounting means including a plurality of superposed plates having aligned openings therein with openings in one of said plates of greater area than those in the remaining plates, a plurality of sectional transfer elements each having a section thereof mounted in the openings in certain of said plates for linear movement only, and the other section of each of said elements extending through a large opening in the first named plate and having means engageable with another of said plates and cooperating with the large opening through which said other section extends to normally maintain the latter section in angular relation to the first named section, and locking lugs insertable into said large openings and engaged with said other sections to shift them from their angular positions to positions in alignment with the first named sections.

16. A transfer unit for the transmission of data, said unit comprising a mounting means including a plurality of superposed plates having aligned openings therein with openings in one of said plates of greater area than those in the remaining plates, a plurality of sectional transfer elements each having a section thereof mounted in the openings in certain of said plates for linear movement only, and the other section of each of said elements extending through a large opening in the first named plate and having means engageable with another of said plates and cooperating with the large opening through which said other section extends to normally maintain the latter section in angular relation to the first named section, and a set-up device mountable upon one of said plates and having openings of different sizes through which said other sections extend, said device being movable relative to the last named plate to adjust certain of said other sections from their angular positions to positions in alignment with the first named sections, the size of the openings in said device determining those other sections which are adjusted by the movement of said device.

17. In a tabulating machine, in combination, an analyzer for sensing perforations in record cards and having an operating cycle for each card analyzed, a plurality of recording members controlled in accordance with the analysis of said cards, means including a plurality of transfer elements for transmitting data from said record cards to said recording members and having operative and inoperative positions, means controlled by said analyzer for actuating the transfer elements which are in operative position, means responsive to the actuation of the operative transfer elements to control said recording members, and a shiftable set-up plate for controlling the positions of said transfer elements, said plate being common to all said cards and having openings therein of different sizes through which said transfer elements extend at all times throughout successive cycles of operation of said analyzer, said openings each identifying a particular recording member by the location of the opening in the plate and controlling, by the size of said openings, the operative and inoperative positions to be assumed by said transfer elements responsive to the shifting of said plate.

18. In a recording machine having means for analyzing records for selectively controlling recording instrumentalities, a transfer unit for the transmission of data from said records to said recording instrumentalities, said unit including a mounting means, a plurality of sectional transfer elements operable to transmit said data and comprising associated sections supported in said mounting means with one section of each transfer element having operative and inoperative positions relative to its associated section, and a movable element also supported in said mounting means in operative association with the first named sections of said transfer elements and having means cooperating with said first named sections upon the movement of said movable element to shift certain of said first named sections from inoperative to operative positions relative to their associated sections for the transmission of said data.

19. In a recording machine having means for analyzing columnar cards for selectively controlling recording elements, a shiftable set-up device for controlling the operative and inoperative positions of data transfer instrumentalities utilized to transmit data from said records to said recording elements, said device comprising a member having a plurality of columns of control openings therein through which said transfer instrumentalities extend when in both operative and inoperative positions, said openings being of different sizes and the number of columns thereof being at least equal to the number of recording elements, and the number of openings in each column being at least equal to the number of columns in said records, said openings each controlling a particular recording element by the columnar location of said opening, and further controlling, when said device is shifted, the operative and inoperative positions of said transfer instrumentalities by the size of said openings.

20. In a recording machine having means for analyzing columnar records for selectively controlling recording elements through a plurality of data transfer instrumentalities having operative and inoperative positions, a shiftable set-up plate operable to selectively adjust said transfer instrumentalities from inoperative to operative positions when said plate is shifted and having columns of openings therein at least equal to the number of said recording elements, each opening adapted to receive one of said transfer instrumentalities, and the number of openings in each column being at least equal to the number of columns in said records, certain of said openings being of greater area than others and all of said certain openings being of the same area, and said other openings being of like area and substantially equal to the cross sectional area of the instrumentalities received therein so as to adjust the latter to operative position when said plate is shifted.

WILLIAM WOCKENFUSS.

REFERENCES CITED

The following references are of record in the file of this patent:

UNITED STATES PATENTS

| Number | Name | Date |
|---|---|---|
| 207,918 | Verea | Sept. 10, 1878 |
| 910,806 | Falvey | Jan. 26, 1909 |
| 957,221 | Lamkin | May 10, 1910 |
| 1,274,484 | Williams | Aug. 6, 1918 |
| 1,730,513 | Lasker | Oct. 8, 1929 |
| 2,027,916 | Lasker | Jan. 14, 1936 |
| 2,034,104 | Lasker | Mar. 17, 1936 |
| 2,110,854 | Fuller | Mar. 15, 1938 |
| 2,113,634 | Tauschek | Apr. 12, 1938 |
| 2,169,213 | Backdahl | Aug. 15, 1939 |
| 2,240,667 | Paris | May 6, 1941 |
| 2,272,411 | Johnson | Feb. 10, 1942 |
| 2,290,827 | Thomas | July 21, 1942 |
| 2,324,438 | Thomas | July 13, 1943 |

FOREIGN PATENTS

| Number | Country | Date |
|---|---|---|
| 339,074 | Great Britain | Dec. 4, 1930 |
| 401,012 | Great Britain | Nov. 9, 1933 |